(12) United States Patent
Bolosky et al.

(10) Patent No.: US 7,454,612 B2
(45) Date of Patent: Nov. 18, 2008

(54) ON-DISK FILE FORMAT FOR A SERVERLESS DISTRIBUTED FILE SYSTEM

(75) Inventors: William J. Bolosky, Issaquah, WA (US); Gerald Cermak, Bothell, WA (US); Atul Adya, Redmond, WA (US); John R. Douceur, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 541 days.

(21) Appl. No.: 11/014,030

(22) Filed: Dec. 16, 2004

(65) Prior Publication Data

US 2005/0097318 A1 May 5, 2005

Related U.S. Application Data

(63) Continuation of application No. 09/814,259, filed on Mar. 21, 2001, now Pat. No. 7,043,637.

(51) Int. Cl.
*H04L 29/00* (2006.01)
(52) U.S. Cl. ........................... 713/165; 713/193
(58) Field of Classification Search ................. 713/165, 713/168, 193
See application file for complete search history.

(56) References Cited

U.S. PATENT DOCUMENTS 5,202,982 A 4/1993 Gramlich et al.
(Continued)

FOREIGN PATENT DOCUMENTS

EP 0663640 7/1995

(Continued)

OTHER PUBLICATIONS

Miller et al, "Strong Security for Distributed File Systems", 2001 IEEE, pp. 34-40.

(Continued)

*Primary Examiner*—Matthew B Smithers
(74) *Attorney, Agent, or Firm*—Lee & Hayes, PLLC

(57) ABSTRACT

A file format for a serverless distributed file system is composed of two parts: a primary data stream and a metadata stream. The data stream contains a file that is divided into multiple blocks. Each block is encrypted using a hash of the block as the encryption key. The metadata stream contains a header, a structure for indexing the encrypted blocks in the primary data stream, and some user information. The indexing structure defines leaf nodes for each of the blocks. Each leaf node consists of an access value used for decryption of the associated block and a verification value used to verify the encrypted block independently of other blocks. In one implementation, the access value is formed by hashing the file block and encrypting the resultant hash value using a randomly generated key. The key is then encrypted using the user's key as the encryption key. The verification value is formed by hashing the associated encrypted block using a one-way hash function. The file format supports verification of individual file blocks without knowledge of the randomly generated key or any user keys. To verify a block of the file, the file system traverses the tree to the appropriate leaf node associated with a target block to be verified. The file system hashes the target block and if the hash matches the access value contained in the leaf node, the block is authentic.

17 Claims, 10 Drawing Sheets

U.S. PATENT DOCUMENTS

| | | | |
|---|---|---|---|
| 5,317,728 A | | 5/1994 | Tevis et al. |
| 5,371,794 A | | 12/1994 | Diffie et al. ................. 713/156 |
| 5,452,447 A | | 9/1995 | Nelson et al. |
| 5,483,652 A | | 1/1996 | Sudama et al. |
| 5,553,235 A | | 9/1996 | Chen et al. |
| 5,564,037 A | * | 10/1996 | Lam ........................... 711/161 |
| 5,586,330 A | | 12/1996 | Knudsen et al. |
| 5,588,147 A | | 12/1996 | Neeman et al. |
| 5,680,611 A | | 10/1997 | Rail et al. |
| 5,692,178 A | | 11/1997 | Shaughnessy |
| 5,745,902 A | | 4/1998 | Miller et al. |
| 5,758,359 A | | 5/1998 | Saxon |
| 5,778,395 A | | 7/1998 | Whiting et al. |
| 5,794,042 A | | 8/1998 | Terada et al. |
| 5,812,776 A | | 9/1998 | Gifford |
| 5,873,085 A | | 2/1999 | Enoki et al. |
| 5,901,227 A | | 5/1999 | Perlman ..................... 713/157 |
| 5,907,673 A | | 5/1999 | Hirayama et al. |
| 5,909,540 A | | 6/1999 | Carter et al. |
| 5,913,217 A | | 6/1999 | Alger et al. |
| 5,915,096 A | | 6/1999 | Rosenzweig et al. |
| 5,950,198 A | | 9/1999 | Falls et al. |
| 5,953,729 A | * | 9/1999 | Cabrera et al. .............. 707/204 |
| 5,968,121 A | | 10/1999 | Logan et al. |
| 5,974,141 A | | 10/1999 | Saito |
| 5,978,805 A | | 11/1999 | Carson |
| 5,991,414 A | | 11/1999 | Garay et al. |
| 5,991,771 A | | 11/1999 | Falls et al. |
| 6,023,506 A | | 2/2000 | Ote et al. |
| 6,026,474 A | | 2/2000 | Carter et al. |
| 6,029,168 A | * | 2/2000 | Frey ........................... 707/10 |
| 6,032,151 A | | 2/2000 | Arnold et al. |
| 6,032,216 A | | 2/2000 | Schmuck et al. |
| 6,047,283 A | | 4/2000 | Braun |
| 6,067,545 A | | 5/2000 | Wolff |
| 6,098,079 A | | 8/2000 | Howard |
| 6,122,378 A | | 9/2000 | Yoshiura et al. |
| 6,122,631 A | | 9/2000 | Berbec et al. |
| 6,145,094 A | | 11/2000 | Shirriff et al. |
| 6,160,552 A | | 12/2000 | Wilsher et al. |
| 6,167,449 A | | 12/2000 | Arnold et al. |
| 6,185,569 B1 | | 2/2001 | East et al. |
| 6,185,574 B1 | | 2/2001 | Howard et al. |
| 6,208,659 B1 | | 3/2001 | Govindarajan et al. |
| 6,233,606 B1 | | 5/2001 | Dujari ........................ 709/213 |
| 6,240,416 B1 | | 5/2001 | Immon et al. |
| 6,259,723 B1 | | 7/2001 | Miyashita |
| 6,260,040 B1 | | 7/2001 | Kauffman et al. |
| 6,263,348 B1 | | 7/2001 | Kathrow et al. |
| 6,269,080 B1 | | 7/2001 | Kumar |
| 6,295,538 B1 | | 9/2001 | Cooper et al. |
| 6,324,544 B1 | | 11/2001 | Alam et al. |
| 6,338,057 B1 | | 1/2002 | Weeks |
| 6,345,288 B1 | | 2/2002 | Reed et al. |
| 6,370,547 B1 | | 4/2002 | Eftink |
| 6,389,433 B1 | | 5/2002 | Bolosky et al. |
| 6,405,315 B1 | | 6/2002 | Burns et al. |
| 6,415,280 B1 | | 7/2002 | Farber et al. |
| 6,415,372 B1 | | 7/2002 | Zakai et al. |
| 6,463,535 B1 | | 10/2002 | Drews |
| 6,466,978 B1 | | 10/2002 | Mukherjee et al. |
| 6,477,544 B1 | | 11/2002 | Bolosky et al. |
| 6,484,186 B1 | | 11/2002 | Rungta |
| 6,484,204 B1 | | 11/2002 | Rabinovich |
| 6,493,804 B1 | | 12/2002 | Soltis et al. |
| 6,510,426 B1 | | 1/2003 | Cohen et al. |
| 6,516,350 B1 | | 2/2003 | Lumelsky et al. |
| 6,522,423 B2 | | 2/2003 | Cohen et al. |
| 6,535,894 B1 | | 3/2003 | Schmidt et al. |
| 6,556,998 B1 | * | 4/2003 | Mukherjee et al. ............ 707/10 |
| 6,560,706 B1 | | 5/2003 | Carbajal et al. |
| 6,577,734 B1 | | 6/2003 | Etzel et al. ................... 380/277 |
| 6,671,821 B1 | | 12/2003 | Castro et al. |
| 6,704,730 B2 | | 3/2004 | Moulton et al. |
| 6,711,559 B1 | | 3/2004 | Kogota et al. |
| 6,718,360 B1 | | 4/2004 | Jones et al. |
| 6,721,880 B1 | | 4/2004 | Pike |
| 6,725,373 B2 | | 4/2004 | Carbajal et al. |
| 6,738,797 B1 | | 5/2004 | Martin |
| 6,742,114 B1 | | 5/2004 | Carter et al. ................. 713/156 |
| 6,748,538 B1 | | 6/2004 | Chan et al. |
| 6,751,627 B2 | | 6/2004 | Sternin |
| 6,766,367 B1 | | 7/2004 | Stevenson et al. |
| 6,788,769 B1 | | 9/2004 | Waites |
| 6,928,426 B2 | | 8/2005 | Dake |
| 6,947,556 B1 | | 9/2005 | Matyas, Jr. et al. |
| 6,952,737 B1 | | 10/2005 | Coates et al. |
| 6,988,124 B2 | | 1/2006 | Douceur et al. |
| 6,990,578 B1 | | 1/2006 | O'Brien et al. |
| 6,993,653 B1 | | 1/2006 | Guski et al. |
| 6,996,714 B1 | | 2/2006 | Halasz et al. |
| 7,000,141 B1 | | 2/2006 | Karlsson et al. |
| 7,010,689 B1 | | 3/2006 | Matyas, Jr. et al. |
| 7,043,637 B2 | | 5/2006 | Bolosky et al. |
| 7,051,028 B2 | | 5/2006 | Shi et al. |
| 7,146,377 B2 | | 12/2006 | Nowicki et al. |
| 7,152,165 B1 | | 12/2006 | Maheshwari et al. |
| 7,249,382 B2 | | 7/2007 | Kawell, Jr. et al. |
| 7,272,630 B2 | | 9/2007 | Douceur et al. |
| 2001/0039548 A1 | | 11/2001 | Shinkai et al. |
| 2002/0016174 A1 | | 2/2002 | Gibson et al. |
| 2002/0038296 A1 | | 3/2002 | Margolus et al. |
| 2002/0066022 A1 | | 5/2002 | Calder et al. |
| 2002/0073082 A1 | | 6/2002 | Duvillier et al. |
| 2002/0088011 A1 | | 7/2002 | Lamkin et al. ............... 725/142 |
| 2002/0095590 A1 | | 7/2002 | Douceur et al. ............. 713/190 |
| 2002/0097878 A1 | | 7/2002 | Ito et al. |
| 2002/0099784 A1 | | 7/2002 | Tran |
| 2002/0103818 A1 | | 8/2002 | Amberden |
| 2002/0111996 A1 | | 8/2002 | Jones et al. |
| 2003/0046533 A1 | | 3/2003 | Olkin et al. ................. 713/152 |
| 2003/0070071 A1 | | 4/2003 | Riedel et al. |
| 2003/0135586 A1 | | 7/2003 | Minborg |
| 2004/0068652 A1 | | 4/2004 | Carpentier et al. |
| 2004/0111608 A1 | * | 6/2004 | Oom Temudo de Castro et al. ........................ 713/156 |
| 2004/0143743 A1 | | 7/2004 | Margolus et al. |
| 2004/0249902 A1 | | 12/2004 | Tadayon et al. |
| 2005/0071315 A1 | | 3/2005 | Douceur et al. |
| 2005/0071330 A1 | | 3/2005 | Douceur et al. |
| 2005/0071339 A1 | | 3/2005 | Douceur et al. |
| 2005/0071340 A1 | | 3/2005 | Douceur et al. |
| 2005/0131961 A1 | | 6/2005 | Margolus et al. |
| 2005/0172124 A1 | | 8/2005 | Carpentier et al. |
| 2005/0222994 A1 | | 10/2005 | Douceur et al. |
| 2005/0246393 A1 | | 11/2005 | Coates et al. |
| 2006/0129807 A1 | | 6/2006 | Halasz et al. |

FOREIGN PATENT DOCUMENTS

EP    1052805    11/2000

OTHER PUBLICATIONS

From the Internet: http://www.isu.edu/departments/comcom/unix. workshop/, retrieved Sep. 28, 2005.
Federal Information Processing Standards Publication 186: Digital Signature Standard (DSS). 1994.
Borg, Digital Signatures Keep Cyberstreets Safe for Shoppers, Computer Technology Review, vol. 16, No. 2, Feb. 1996 p. 1.
Hu, Some Thoughts on Agent Trust and Delegation, Available at http://www.cs.nccu.edu.tw/jong, 2001, pp. 489-496.
ISU: http://www.isu.edu/departments/comcom/unix/workshop/shell.html, "Section 4: The UNIX Shell", 3 pages.

E. Adar and B. Huberman, "Free Riding on Gnutella," Xerox PARC Technical Report, pp. 1-22, Aug. 2000.

R. Anderson, "The Eternity Service," Prago-Crypt, pp. 242-252, Oct. 1996.

T. Anderson, M. Dahlin, J. Neefe, D. Patterson, D. Roselli, and R. Wang, "Serverless Network File Systems," 15th Symposium on Operating Systems Principles, pp. 109-126, Dec. 1995.

W. Bolosky, J. Douceur, D. Ely, M. Theimer, "Feasibility of a Serverless Distributed File System Deployed on an Existing Set of Desktop PCs", Proceedings of the International Conference on Measurement and Modeling of Computer Systems, pp. 34-43, Jun. 17-21, 2000.

W. Bolosky, S. Corbin, D. Goebel, and J. Douceur, "Single Instance Storage in Windows® 2000," Proceedings of the 4th USENIX Windows Systems Symposium, pp. 13-24, Aug. 2000.

G. Cabri, A. Corradi, F. Zambonelli, "Experience of Adaptive Replication in Distributed File Systems", 22nd IEEE Euromicro, 10 pages, Sep. 1996.

M. Castro and B. Liskov, "Practical Byzantine Fault Tolerance," Proceedings of the Third Symposium on Operating Systems Design and Implementation, 14 pages, Feb. 1999.

M. Castro and B. Liskov, "Proactive Recovery in a Byzantine-Fault-Tolerant System," 4th Symposium on Operating Systems Design and Implementation, pp. 273-287, Oct. 2000.

I. Clarke, O. Sandberg, B. Wiley, and T. Hong, "Freenet: A Distributed Anonymous Information Storage and Retrieval System," ICSI Workshop on Design Issues in Anonymity and Unobservability, 21 pages, Jul. 2000.

J. Douceur and W. Bolosky, "A Large-Scale Study of File-System Contents," SIGMETRICS, pp. 59-70, May 1999.

L. Fan, P. Cao, J. Almeida, and A. Broder, "Summary Cache: A Scalable Wide-Area Web Cache Sharing Protocol", ACM SIGCOMM, pp. 254-265, 1998.

R. T. Reich and D. Albee, "S.M.A.R.T. Phase-II," No. WP-9803-001, Maxtor Corporation, 3 pages, Feb. 1998.

J. D. Saltzer and M. D. Schroeder. "The Protection of Information in Computer Systems," Proceedings of the IEEE 63(9), pp. 1278-1308, Sep. 1975.

R. Sandberg, D. Goldberg, S. Kleiman, D. Walsh, and B. Lyon, "Design and Implementation of the Sun Network Filesystem," Summer USENIX Conference, pp. 119-130, Jun. 1985.

A. Sweeny, D. Doucette, W. Hu, C. Anderson, M. Nishimoto, and G. Peck, "Scalability in the XFS File System," USENIX Annual Technical Conference, 15 pages, 1996.

C. Thekkath, T. Mann, and E. Lee, "Frangipani: A Scalable Distributed File System," 16th ACM Symposium on Operating Systems Principles, pp. 224-237, 1997.

W. Vogels, "File system usage in Windows NT 4.0," 17th ACM Symposium on Operating Systems Principles, pp. 93-109, Dec. 1999.

J. Wylie, M. Bigrigg, J. Strunk, G. Ganger, H. Kiliççöte, and P. Khosla, "Survivable Information Storage Systems," IEEE Computer, pp. 33(8):61-68, Aug. 2000.

A. Goldberg and P. Yianilos, "Towards an Archival Intermemory," IEEE International Forum on Research and Technology Advances in Digital Libraries, pp. 147-156, Apr. 1998.

J. Howard, M. Kazar, S. Menees, D. Nichols, M. Satyanarayanan, R. Sidebotham, and M. West, "Scale and Performance in a Distributed File System," ACM Transactions on Computer Systems, pp. 51-81, Feb. 1988.

J. Kistler and M. Satyanarayanan, "Disconnected Operation in the Coda File System," ACM Transactions on Computer Systems, vol. 10, No. 1, pp. 3-25, Feb. 1992.

J. Kubiatowicz et al., "OceanStore: An Architecture for Global-Scale Persistent Storage," Proceedings of the Ninth International Conference on Architectural Support for Programming Languages and Operating Systems, 12 pages, Nov. 2000.

E. Lee and C. Thekkath, "Petal: Distributed Virtual Disks," Seventh International Conference on Architectural Support for Programming Languages and Operating Systems, pp. 84-92, Oct. 1996.

D. Mazières, M. Kaminsky, M. F. Kaashoek, and E. Witchel, "Separating Key Management from File System Security", 17th ACM Symposium on Operating Systems Principles, pp. 124-139, Dec. 1999.

D.L. McCue, M.C. Little, "Computing Replica Placement in Distributed Systems", IEEE Second Workshop on Replicated Data, pp. 58-61, Nov. 1992.

M. K. McKusick, W. N. Joy, S. J. Leffler, and R. S. Fabry, "A Fast File System for Unix," ACM Transactions on Computer Systems, vol. 2, No. 3, pp. 181-187, Aug. 1984.

The OceanStore Project web pages, http://oceanstore.cs.berkeley.edu/info/overview.html, 2 pages, last modified Jul. 8, 2002.

C. Plaxton, R. Rajaraman, and A Richa, "Accessing Nearby Copies of Replicated Objects in a Distributed Environment", Proceedings of the 9th Annual ACM Symposium on Parallel Algorithms and Architectures, pp. 311-320, 1997.

C. Plaxton, R. Rajaraman, and A Richa, "Accessing Nearby Copies of Replicated Objects in a Distributed Environment", Theory of Computing Systems, pp. 32:241-280, 1999.

Evans, Matt, "FTFS: The Design of A Fault Tolerant Distributed File-System," May 2000, pp. 1-49.

Cheriton, David R. and Mann, Timothy P., "Decentralizing a Global Naming Service for Improved Performance and Fault Tolerance," ACM Transactions on Computer Systems, vol. 7, No. 2, May 1989, pp. 147-183.

Ferbrache, "A Pathology of Computer Viruses", Springer-Verlag London Limited, 1992, pp. 6.

Coulouris, et al., Transplanted by Tadanori et al., Distributed Systems:, Japan, Denkishoin Co., Ltd., Second Edition, Oct. 31, 1997, pp. 785-827.

* cited by examiner

ON-DISK FILE FORMAT FOR A SERVERLESS DISTRIBUTED FILE SYSTEM

RELATED APPLICATION(S)

This is a continuation of U.S. patent application Ser. No. 09/814,259, entitled "On-Disk File Format for a Serverless Distributed File System", which was filed Mar. 21, 2001, and is assigned to Microsoft Corporation.

TECHNICAL FIELD

This invention relates to serverless distributed file systems, and particularly to formats of files stored in serverless distributed file systems.

BACKGROUND

File systems manage files and other data objects stored on computer systems. File systems were originally built into a computer's operating system to facilitate access to files stored locally on resident storage media. As computers became networked, some file storage capabilities were offloaded from individual user machines to special storage servers that stored large numbers of files on behalf of the user machines. When a file was needed, the user machine simply requested the file from the server. In this server-based architecture, the file system was extended to facilitate management of and access to files stored remotely at the storage server over a network.

One problem that arises in distributed file systems concerns storage of identical files on the server. While some file duplication normally occurs on an individual user's personal computer, duplication unfortunately tends to be quite prevalent on networks where a server centrally stores the contents of multiple personal computers. For example, with a remote boot facility on a computer network, each user boots from that user's private directory on a file server. Each private directory thus ordinarily includes a number of files that are identical to files on other users' directories. Storing the private directories on traditional file systems consumes a great amount of disk and server file buffer cache space. From a storage management perspective, it is desirable to minimize file duplication to reduce the amount of wasted storage space used to store redundant files. However, any such efforts need to be reconciled with the file system that tracks the multiple duplicated files on behalf of the associated users.

To address the problems associated with storing multiple identical files on a computer, Microsoft developed a single instance store (SIS) system that is packaged as part of the Windows 2000 operating system. The SIS system reduces file duplication by automatically identifying common identical files of a file system, and then merging the files into a single instance of the data. One or more logically separate links are then attached to the single instance to represent the original files to the user machines. In this way, the storage impact of duplicate files on a computer system is greatly reduced.

Today, file storage is migrating toward a model in which files are stored on various networked computers, rather than on central storage server. The serverless architecture poses new challenges to file systems. One particular challenge concerns managing files that are distributed over many different computers in a manner that allows a user to quickly access a file, verify that it is indeed the requested file, and read/write that file, all while insuring that the files are stored and accessed in a secure way that prevents access by non-authorized users.

The invention addresses these challenges and provides solutions that are effective for distributed file systems, and in particular, serverless distributed file systems.

SUMMARY

A file format for a serverless distributed file system is composed of two parts: a primary data stream and a metadata stream. The data stream contains a file that is divided into multiple blocks. Each block is encrypted using a symmetric cipher (e.g., RC4) and a hash of the block as the encryption key. The metadata stream contains a header, a structure for indexing the encrypted blocks in the primary data stream, and some user information.

The indexing tree structure defines leaf nodes for each of the blocks. Each leaf node consists of an access value used for decryption of the associated block and a verification value used to independently verify the encrypted block independently of other blocks. In one implementation, the access value is formed by hashing the file block and encrypting the resultant hash value using a symmetric cipher and a randomly generated key. The key is then encrypted using an asymmetric cipher (e.g., RSA) and the user's public key as the encryption key. The verification value is formed by hashing the associated encrypted block using a one-way hash function (e.g., SHA).

Depending on the size of the file, the indexing structure may include intermediate nodes formed by grouping the leaf nodes into tree blocks and computing hash values of each tree block. These intermediate nodes can again be segmented into blocks and each block hashed to form the next nodes. This can be repeated as many times as desired until reaching a root node. The root node is then hashed, and the hash value is used along with the metadata header and user information to produce a verification value for the entire file. In one implementation, the whole-file verification value is signed with a user's signature. Alternatively, a file may be constructed without such signatures.

The file format supports verification of individual file blocks without knowledge of the randomly generated key or any user keys. To verify a block of the file, the file system optionally evaluates the signature on whole file verification value (if one exists), checks that the whole-file verification value matches the hash of the root block, metadata header and user information and then traverses the tree to the appropriate leaf node associated with a target block to be verified. The file system hashes the target block and if the hash matches the access value contained in the leaf node, the block is authentic.

The file format further supports reading from and writing to individual blocks without interfering with other blocks. The file format is also conducive for sparse files that have vast areas of non-data.

BRIEF DESCRIPTION OF THE DRAWINGS

The same numbers are used throughout the document to reference like components and/or features.

DETAILED DESCRIPTION

The following discussion is directed to a file format used in a distributed file system, and to techniques for managing access to and verification of files using the file format. The file system is described in the context of a symbiotic, serverless, distributed file system that runs on multiple networked computers and stores files across the computers rather than on a central server or cluster of servers. The symbiotic nature implies that the machines cooperate but do not completely trust one another.

The file system does not manage the storage disk directly, but rather relies on existing file systems on local machines, such as those file systems integrated into operating systems (e.g., the Windows NT® file system). The file system described herein assumes a level at which multi-stream files can be stored as the underlying local storage model.

While the file system is described in the context of storing "files", it should be noted that other types of storable data can be stored in the file system. The term "file" is used for discussion purposes and is intended to include data objects or essentially any other storage subject matter that may not be commonly characterized as a "file".

Serverless Distributed File System

Figure 1:
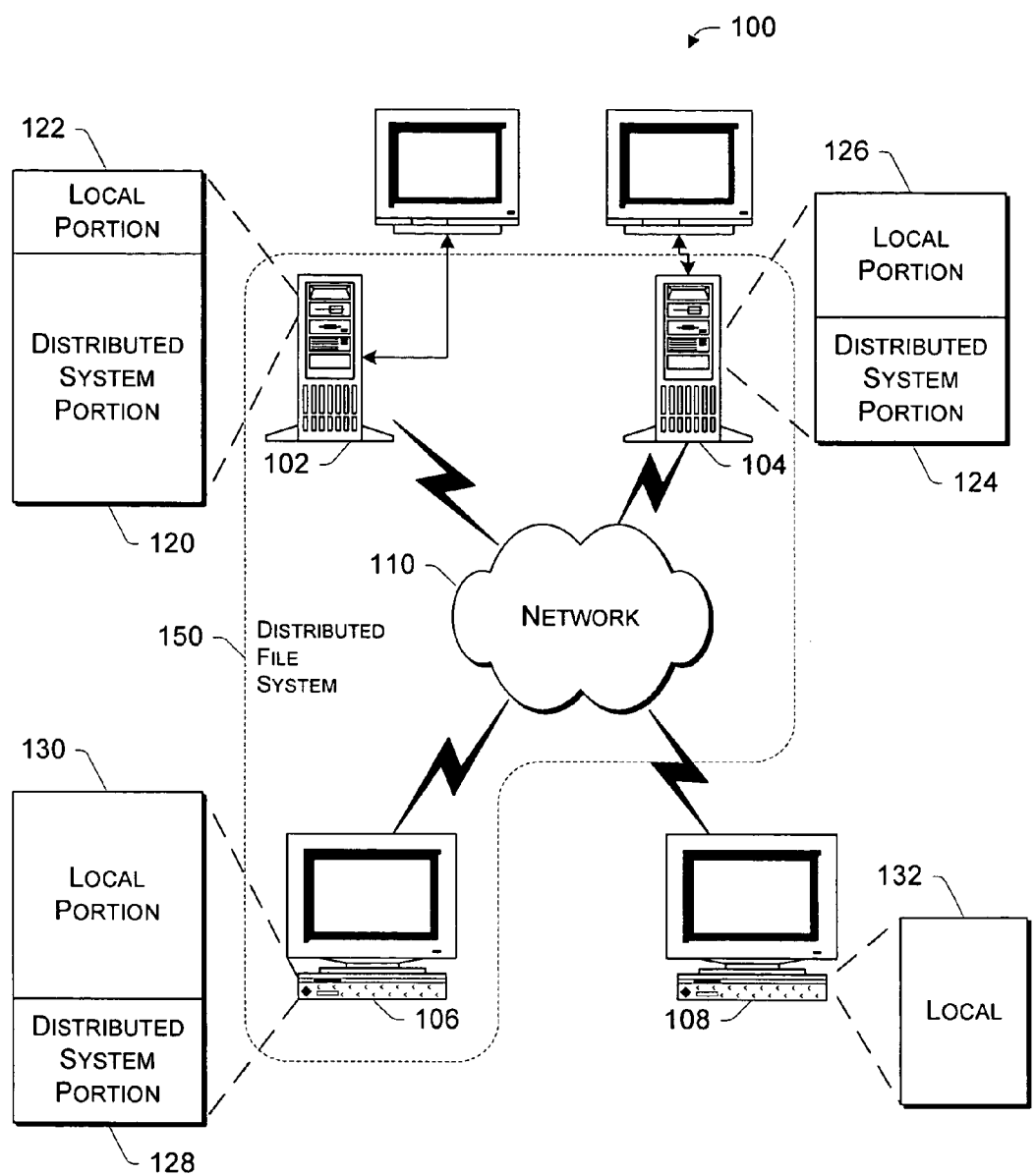
FIG. 1 is an illustration of a networked computing system that implemented a serverless distributed file system.

FIG. 1 illustrates an exemplary network environment 100 that supports a serverless distributed file system. Four client computing devices 102, 104, 106, and 108 are coupled together via a data communications network 110. Although four computing devices are illustrated, different numbers (either greater or fewer than four) may be included in network environment 100.

Network 110 represents any of a wide variety of data communications networks. Network 110 may include public portions (e.g., the Internet) as well as private portions (e.g., an internal corporate Local Area Network (LAN)), as well as combinations of public and private portions. Network 110 may be implemented using any one or more of a wide variety of conventional communications media including both wired and wireless media. Any of a wide variety of communications protocols can be used to communicate data via network 110, including both public and proprietary protocols. Examples of such protocols include TCP/IP, IPX/SPX, NetBEUI, etc.

Computing devices 102-108 represent any of a wide range of computing devices, and each device may be the same or different. By way of example, devices 102-108 may be desktop computers, laptop computers, handheld or pocket computers, personal digital assistants (PDAs), cellular phones, Internet appliances, consumer electronics devices, gaming consoles, and so forth.

Two or more of devices 102-108 operate to implement a serverless distributed file system. The actual devices included in the serverless distributed file system can change over time, allowing new devices to be added to the system and other devices to be removed from the system. Each device 102-108 that is part of the distributed file system has portions of its mass storage device(s) (e.g., hard disk drive) allocated for use as either local storage or distributed storage. The local storage is used for data that the user desires to store on his or her local machine and not in the distributed file system structure. The distributed storage portion is used for data that the user of the device (or another device) desires to store within the distributed file system structure.

In the illustrated example of FIG. 1, certain devices connected to network 110 have one or more mass storage devices that include both a distributed portion and a local portion. The amount allocated to distributed or local storage varies among the devices. For example, device 102 has a larger percentage allocated for a distributed system portion 120 in comparison to the local portion 122; device 104 includes a distributed system portion 124 that is approximately the same size as the local portion 126; and device 106 has a smaller percentage allocated for a distributed system portion 128 in comparison to the local portion 130. The storage separation into multiple portions may occur on a per storage device basis (e.g., one hard drive is designated for use in the distributed system while another is designated solely for local use), and/or within a single storage device (e.g., part of one hard drive may be designated for use in the distributed system while another part is designated for local use). The amount allocated to distributed or local storage may vary over time. Other devices connected to network 110, such as computing device 108, may not be part of the distributed file system and thus do not have any of their mass storage device(s) allocated for use by the distributed system. Hence, device 108 has only a local portion 132.

A distributed file system 150 operates to store one or more copies of files on different computing devices 102-106. When a new file is created by the user of a computer, he or she has the option of storing the file on the local portion of his or her computing device, or alternatively in the distributed file system. If the file is stored in the distributed file system 150, the file will be stored in the distributed system portion of the mass storage device(s) of one or more of devices 102-106. The user creating the file typically has no ability to control which device 102-106 the file is stored on, nor any knowledge of which device 102-106 the file is stored on. Additionally, replicated copies of the file will typically be saved, allowing the user to subsequently retrieve the file even if one of the computing devices 102-106 on which the file is saved is unavailable (e.g., is powered-down, is malfunctioning, etc.).

The distributed file system 150 is implemented by one or more components on each of the devices 102-106, thereby obviating the need for any centralized server to coordinate the file system. These components operate to determine where particular files are stored, how many copies of the files are created for storage on different devices, and so forth. Exactly which device will store which files depends on numerous factors, including the number of devices in the distributed file system, the storage space allocated to the file system from each of the devices, how many copies of the file are to be saved, a cryptographically secure random number, the number of files already stored on the devices, and so on. Thus, the distributed file system allows the user to create and access files (as well as folders or directories) without any knowledge of exactly which other computing device(s) the file is being stored on.

The files stored by the file system are distributed among the various devices 102-106 and stored in encrypted form. When a new file is created, the device on which the file is being created encrypts the file prior to communicating the file to other device(s) for storage. The directory entry (e.g., the file name) for a new file is also communicated to the other device(s) for storage. Additionally, if a new folder or directory is created, the directory entry (e.g., folder name or directory name) is also communicated to the other device(s) for storage. As used herein, a directory entry refers to any entry that can be added to a file system directory, including both file names and directory (or folder) names.

The distributed file system 150 is designed to prevent unauthorized users from reading data stored on one of the devices 102-106. Thus, a file created by device 102 and stored on device 104 is not readable by the user of device 104 (unless he or she is authorized to do so). In order to implement such security, the contents of files as well as all directory entries are encrypted, and only authorized users are given the decryption key. Thus, although device 104 may store a file created by device 102, if the user of device 104 is not an authorized user of the file, the user of device 104 cannot decrypt (and thus cannot read) either the contents of the file or its directory entry (e.g., filename).

File Encryption

The files are encrypted using a technology known as "convergent encryption". Convergent encryption has the following two properties. First, if two or more encryptable objects are identical, then even if different encryption keys are used to encrypt them to provide individual cipher objects, one does not need to have access to any of the encryption keys to determine from an examination of the cipher objects that the encryptable objects are identical. Second, if two or more encryptable objects are identical but are encrypted with different encryption keys, the total space that is required to store all of the cipher objects is proportional to the space that is required to store a single encryptable object, plus a constant amount of storage for each distinct encryption key.

Generally, according to convergent encryption, a file F (or any other type of encryptable object) is initially hashed using a one-way hashing function h (e.g., SHA, MD5, etc.) to produce a hash value h(F). The file F is then encrypted using a symmetric cipher (e.g., RC4, RC2, etc.) with the hash value as the key, or $E_{h(F)}(F)$. Next, read access control entries are created for each authorized user who is granted read access to the encrypted file. Write access control is governed by the directory server that stores the directory entry for the file, and it is thus not addressed by the file format and is not discussed further within this document. All references to "access" within this document refer to read access. The access control entries are formed by encrypting the file's hash value h(F) with any number of keys $K_1, K_2, \ldots, K_m$, to yield $E_{K1}(h(F))$, $E_{K2}(h(F)), \ldots, E_{Km}(h(F))$. In one implementation, each key K is the user's public key of a public/private key pair for an asymmetric cipher (e.g., RSA).

With convergent encryption, one encrypted version of the file is stored and replicated among the serverless distributed file system 150. Along with the encrypted version of the file is stored one or more access control entries depending upon the number of authorized users who have access. Thus, a file in the distributed file system 150 has the following structure:

$$[E_{h(F)}(F), <E_{K1}(h(F))>, <E_{K2}(h(F))>, \ldots, <E_{Km}(h(F))>]$$

One advantage of convergent encryption is that the encrypted file can be evaluated by the file system to determine whether it is identical to another file without resorting to any decryption (and hence, without knowledge of any encryption keys). Unwanted duplicative files can be removed by adding the authorized user(s) access control entries to the remaining file. Another advantage is that the access control entries are very small in size, on the order of bytes as compared to possibly gigabytes for the encrypted file. As a result, the amount of overhead information that is stored in each file is small. This enables the property that the total space used to store the file is proportional to the space that is required to store a single encrypted file, plus a constant amount of storage for each additional authorized reader of the file.

For more information on convergent encryption, the reader is directed to co-pending U.S. patent application Ser. No. 09/565,821, entitled "Encryption Systems and Methods for Identifying and Coalescing Identical Objects Encrypted with Different Keys", which was filed May 5, 2000, in the names of Douceur et al., and is commonly assigned to Microsoft Corporation. This application is hereby incorporated by reference.

Computing Device Architecture

Figure 2:
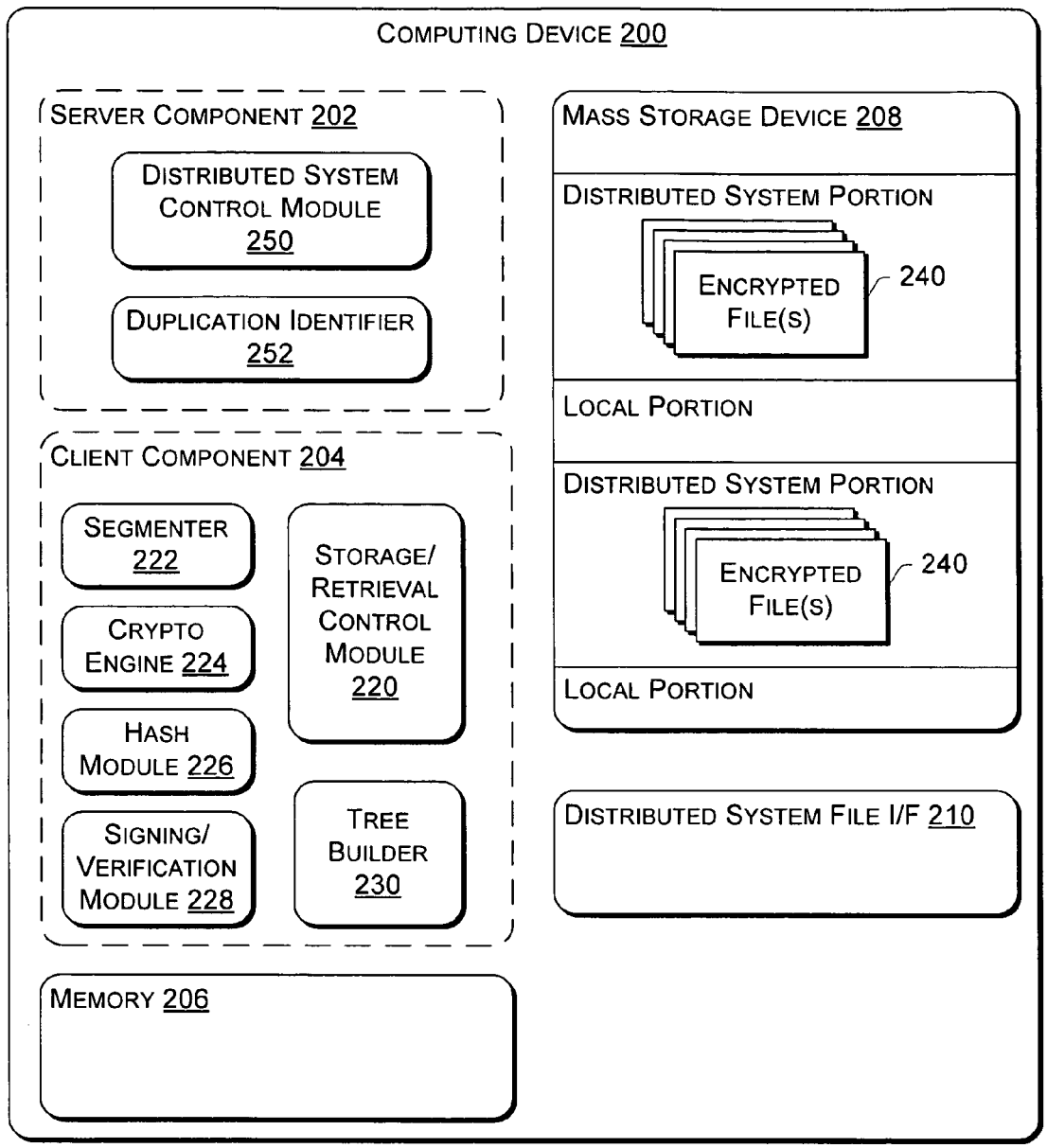
FIG. 2 is a block diagram of logical components implemented at each of the computers in the computing system of FIG. 1.

FIG. 2 illustrates logical components of an exemplary computing device 200 that is representative of any one of the devices 102-106 of FIG. 1 that participate in the distributed file system 150. Computing device 200 includes a server component 202, a client component 204, a memory 206, a mass storage device 208, and a distributed file system interface 210. Computing device 200 also typically includes additional components (e.g., a processor), however these additional components have not been shown in FIG. 2 so as not to clutter the drawings. A more general description of a computer architecture with various hardware and software components is described below with reference to FIG. 3.

Memory 206 can be any of a wide variety of conventional volatile and/or nonvolatile memories, such as RAM, ROM, Flash memory, and so on. Mass storage device 208 can be any of a wide variety of conventional nonvolatile storage devices, such as a magnetic disk, optical disk, Flash memory, and so forth. Mass storage device 208 is partitioned into a distributed system portion and a local portion.

Computing device 200 is intended to be used in a serverless distributed file system, and as such includes both a server component 202 and client component 204. Server component 202 handles requests when device 200 is responding to a request involving a file or directory entry stored (or to be stored) in storage device 208, while client component 204 handles the issuance of requests by device 200 for files stored (or to be stored) in the distributed file system. Client component 204 and server component 202 operate independent of one another. Thus, situations can arise where the serverless distributed file system 150 causes files being stored by client component 204 to be stored in mass storage device 208 by server component 202.

Client component 204 includes a storage and retrieval control module 220, which along with interface 210, manages access to the serverless distributed file system 150 for the creation, storage, retrieval, reading, writing, modifying, and verifying of files and directories on behalf of computing device 150. The control module 220 uses a segmenting module 222, a cryptographic engine 224, a hashing module 226, a signing/verification module 228, and tree builder 230 when 11 handling the encrypted files 240 stored in the distributed system portion of the mass storage 208. These components 222-230 perform the various operations of the convergent encryption process to create and maintain files, as well as facilitating verification of the contents of the files without decryption. These components are described in more detail below.

The server component 202 includes a distributed system control module 250 and a duplication identifier 252. Distributed system control module 250 manages access to the encrypted files 240. It communicates with mass storage device 208 to store and retrieve encrypted files 240. Distributed system control module 250 also maintains a record of the encrypted directory entries (not shown) in memory 206 and/or mass storage device 208 that are stored at computing device 200 (or alternatively that are stored elsewhere in the serverless distributed file system).

Duplication identifier 252 helps identify identical encrypted files in the distributed file system. When the duplication identifier 252 finds a duplication that is not an intentional replication for fault tolerant purposes, the duplication identifier 252 notifies the control module 250, which then eliminates the duplicated file and adds the access control entries to the eliminated file to the remaining file.

Figure 3:
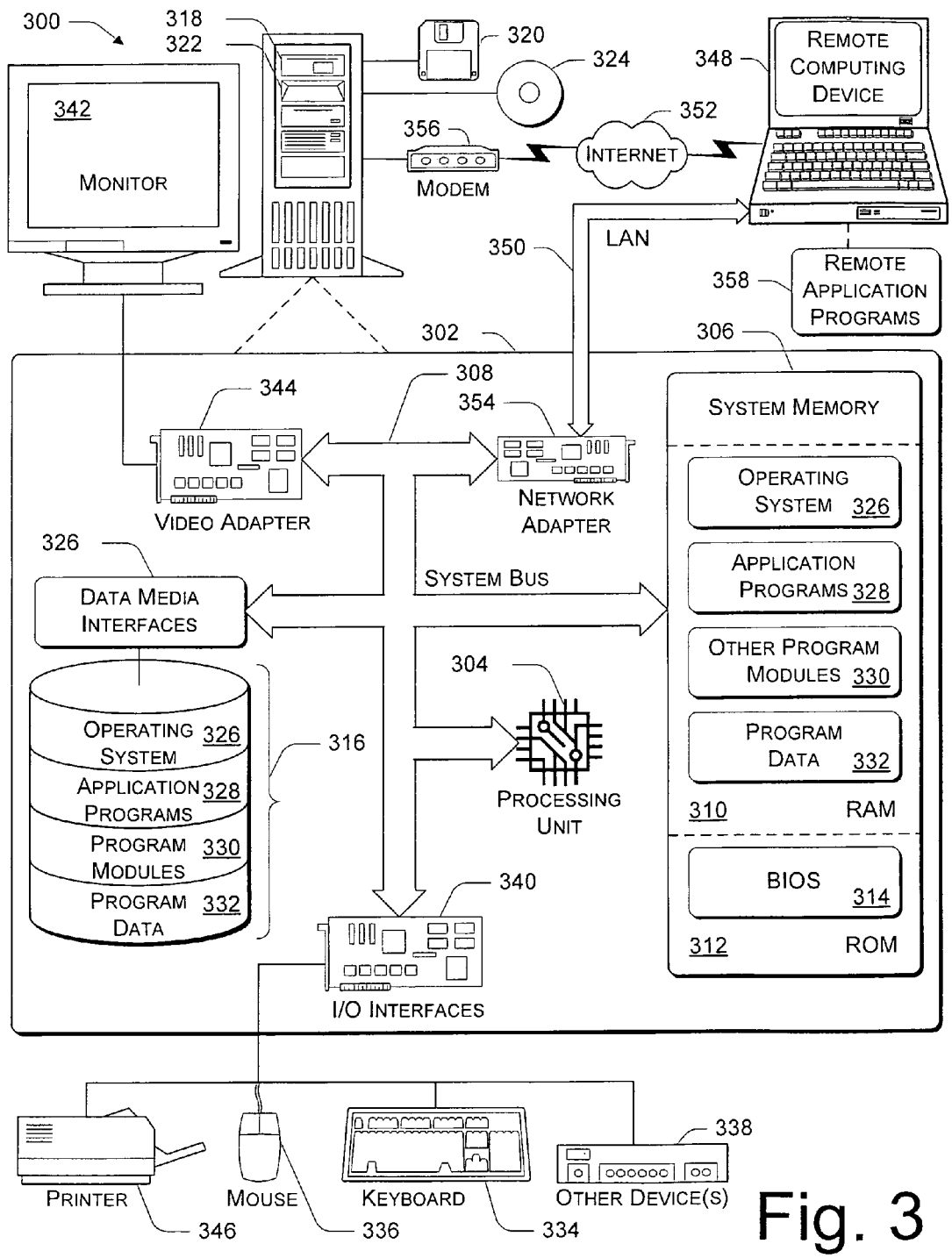
FIG. 3 is a block diagram of a computer that may be used to implement a computer in the computing system of FIG. 1.

FIG. 3 illustrates a more general computer environment 300, which is used to implement the distributed file system. The computer environment 300 is only one example of a computing environment and is not intended to suggest any limitation as to the scope of use or functionality of the computer and network architectures. Neither should the computer environment 300 be interpreted as having any dependency or requirement relating to any one or combination of components illustrated in the exemplary computer environment 300.

Computer environment 300 includes a general-purpose computing device in the form of a computer 302. The components of computer 302 can include, by are not limited to, one or more processors or processing units 304, a system memory 306, and a system bus 308 that couples various system components including the processor 304 to the system memory 306.

The system bus 308 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 302 typically includes a variety of computer readable media. Such media can be any available media that is accessible by computer 302 and includes both volatile and non-volatile media, removable and non-removable media.

The system memory 306 includes computer readable media in the form of volatile memory, such as random access memory (RAM) 310, and/or non-volatile memory, such as read only memory (ROM) 312. A basic input/output system (BIOS) 314, containing the basic routines that help to transfer information between elements within computer 302, such as during start-up, is stored in ROM 312. RAM 310 typically contains data and/or program modules that are immediately accessible to and/or presently operated on by the processing unit 304.

Computer 302 may also include other removable/non-removable, volatile/non-volatile computer storage media. By way of example, FIG. 3 illustrates a hard disk drive 316 for reading from and writing to a non-removable, non-volatile magnetic media (not shown), a magnetic disk drive 318 for reading from and writing to a removable, non-volatile magnetic disk 320 (e.g., a "floppy disk"), and an optical disk drive 322 for reading from and/or writing to a removable, non-volatile optical disk 324 such as a CD-ROM, DVD-ROM, or other optical media. The hard disk drive 316, magnetic disk drive 318, and optical disk drive 322 are each connected to the system bus 308 by one or more data media interfaces 326. Alternatively, the hard disk drive 316, magnetic disk drive 318, and optical disk drive 322 can be connected to the system bus 308 by one or more interfaces (not shown).

The disk drives and their associated computer-readable media provide non-volatile storage of computer readable instructions, data structures, program modules, and other data for computer 302. Although the example illustrates a hard disk 316, a removable magnetic disk 320, and a removable optical disk 324, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 316, magnetic disk 320, optical disk 324, ROM 312, and/or RAM 310, including by way of example, an operating system 326, one or more application programs 328, other program modules 330, and program data 332. Each of such operating system 326, one or more application programs 328, other program modules 330, 5 and program data 332 (or some combination thereof) may implement all or part of the resident components that support the distributed file system.

A user can enter commands and information into computer 302 via input devices such as a keyboard 334 and a pointing device 336 (e.g., a "mouse"). Other input devices 338 (not shown specifically) may include a microphone, joystick, game pad, satellite dish, serial port, scanner, and/or the like. These and other input devices are connected to the processing unit 304 via input/output interfaces 340 that are coupled to the system bus 308, but may be connected by other interface and bus structures, such as a parallel port, game port, or a universal serial bus (USB).

A monitor 342 or other type of display device can also be connected to the system bus 308 via an interface, such as a video adapter 344. In addition to the monitor 342, other output peripheral devices can include components such as speakers (not shown) and a printer 346 which can be connected to computer 302 via the input/output interfaces 340.

Computer 302 can operate in a networked environment using logical connections to one or more remote computers, such as a remote computing device 348. By way of example, the remote computing device 348 can be a personal computer, portable computer, a server, a router, a network computer, a peer device or other common network node, and the like. The remote computing device 348 is illustrated as a portable computer that can include many or all of the elements and features described herein relative to computer 302.

Logical connections between computer 302 and the remote computer 348 are depicted as a local area network (LAN) 350 and a general wide area network (WAN) 352. Such networking environments are commonplace in offices, enterprise-wide computer networks, intranets, and the Internet.

When implemented in a LAN networking environment, the computer 302 is connected to a local network 350 via a network interface or adapter 354. When implemented in a WAN networking environment, the computer 302 typically includes a modem 356 or other means for establishing communications over the wide network 352. The modem 356, which can be internal or external to computer 302, can be connected to the system bus 308 via the input/output interfaces 340 or other appropriate mechanisms. It is to be appreciated that the illustrated network connections are exemplary and that other means of establishing communication link(s) between the computers 302 and 348 can be employed.

In a networked environment, such as that illustrated with computing environment 300, program modules depicted relative to the computer 302, or portions thereof, may be stored in a remote memory storage device. By way of example, remote application programs 358 reside on a memory device of remote computer 348. For purposes of illustration, application programs and other executable program components such as the operating system are illustrated herein as discrete blocks, although it is recognized that such programs and components reside at various times in different storage components of the computing device 302, and are executed by the data processor(s) of the computer.

An implementation of the distributed file system 150 may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of the file format for the encrypted files may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

File Format

Figure 4:
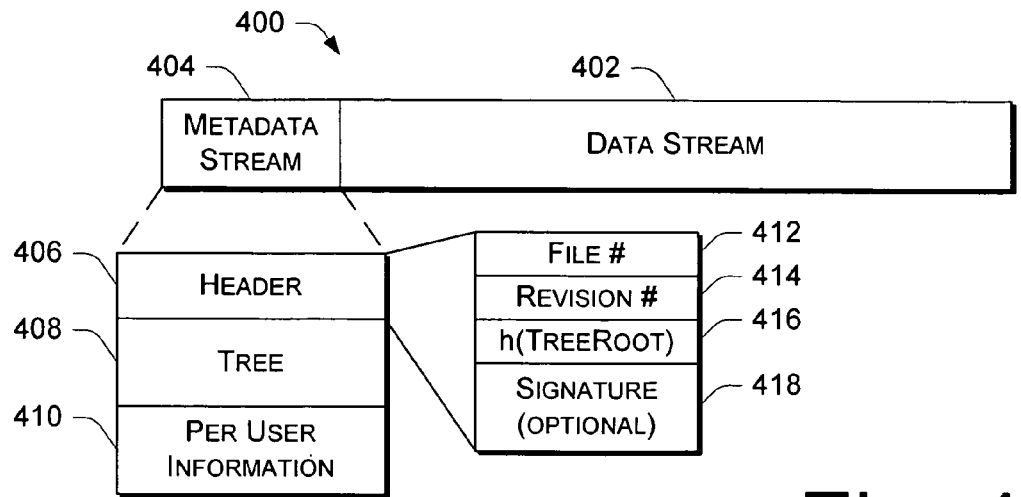
FIG. 4 illustrates a file format for a file stored in the serverless distributed file system. The file format includes a data stream and a metadata stream.

FIG. 4 generally shows a file format 400 of a file that is stored in the distributed file system 150. The file format is composed of two parts: a data stream 402 and a metadata stream 404. The data stream 402 contains the contents of the file, which makes up the bulk of the entire file. The data stream 402 is a primary (unnamed) data stream that may be analyzed using the single instance store (SIS) technology introduced by Microsoft Corporation and discussed in the Background section. SIS components work on unnamed streams, while ignoring other streams. The metadata stream 404 of the file 400 is a separate named stream that is ignored by the SIS system.

For discussion purposes, each file is described as containing only a single user-defined stream, and that stream is the unnamed data stream. However, the distributed file system 150 is capable of supporting any number of user-defined streams per file. A file naming convention differentiates among multiple streams by prepending a user-defined stream name to a file system stream name "FSMetadata$". So, if a user file has a named stream called "alternateStream", the file would have a second metadata stream called "alternateStreamFSMetadata$." If a user has the bad taste to name a stream with a string that ends in "FSMetadata$" followed by 0 or more "$"s, the file system changes the name of the stream by adding an additional "$".

Data Stream 402

The data stream 402 is designed to allow efficient verification, reading, and writing of portions of the file, without affecting other portions. The data stream is encrypted using the convergent encryption technology described above beneath the heading "File Encryption". For small files, the entire file is hashed and encrypted using the resulting hash value as the encryption key. The encrypted file can be verified without knowledge of the key or any need to decrypt the file first. For large files, however, it is difficult to read or update only part of a file because the encryption of the file is based on a hash of the entire file contents. Any write to a file would require re-hashing the entire file followed by re-encrypting with the newly generated hash as the key. Furthermore, verification involves hashing the entire file and examining the hash value. Taking a single hash of the ciphertext of a large file for verification purposes makes writes to part of the file expensive, because any write would once again require hashing the whole file.

Figure 5:
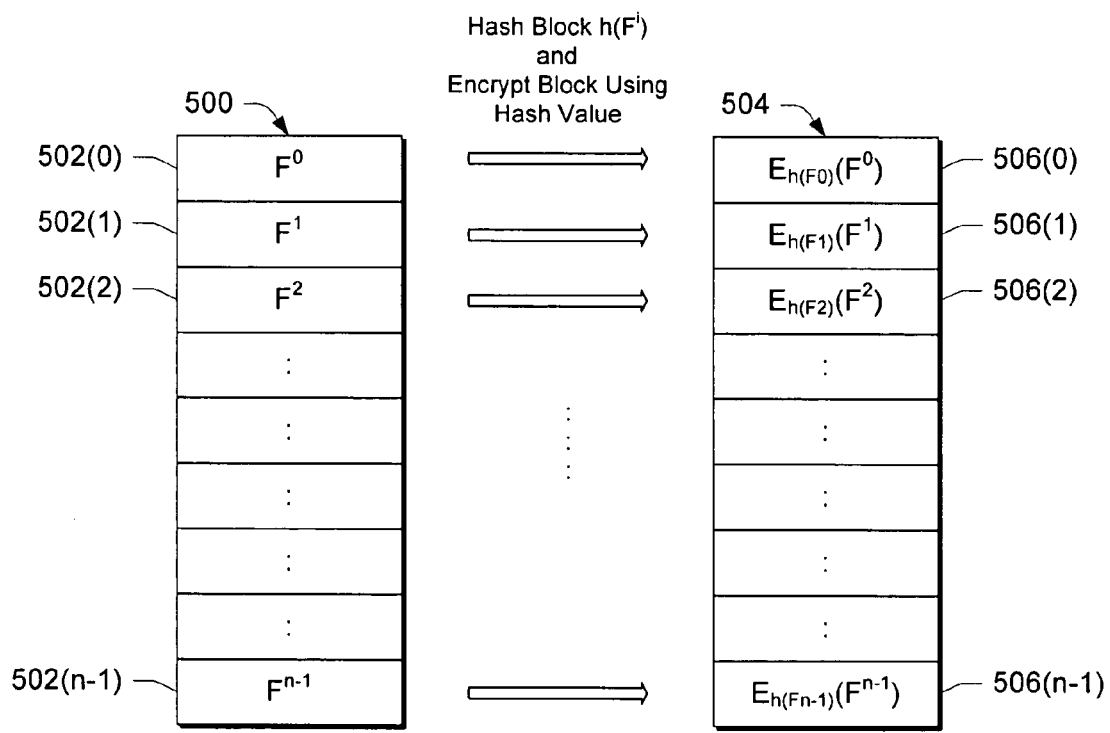
FIG. 5 shows a file that is segmented and encrypted to form the data stream of the file format.

To overcome this problem for large files, the file contents in the data stream 402 can be broken into smaller blocks and then convergent encryption can be applied separately to each block. FIG. 5 shows a file F that is segmented by segmenting module 222 into an array 500 of multiple blocks 502(0)-502(n−1). In one implementation, the blocks are fixed sized chunks. For example, the file F is segmented into "n" pages $F^0$-$F^{n-1}$, where each page is a fixed size. A 4 Kbyte size is one suitable size of each block because it is the smallest page size used by NT systems (although some architectures use multiples of 4K). Hence, it is the smallest chunk that the memory manager is going to request on a cache miss or user mapped file page fault, and it is also the smallest chunk that is going to be written by the lazy writer.

From the system perspective, each page is originally deemed as "cleartext", meaning that it has not yet undergone encryption as part of the convergent encryption process. The file F may actually be in a plain, unencrypted form, or it may have already been encrypted in some manner. Thus, by noting that each file page is "cleartext", we are simply explaining the process from the point of view of the convergent encryption process, regardless of the condition in which file F originally resides.

Convergent encryption is then applied to the file at the block level. That is, each block $F^i$ is separately hashed using a one-way hash function (e.g., SHA, MD5, etc.) to produce a hash value $h(F^i)$. Each block $F^i$ is then encrypted using a symmetric cipher (e.g., RC4, RC2, etc.) and the hash value $h(F^i)$ as the key, or $E_{h(F^i)}(F^i)$. This produces an array 504 of encrypted blocks 506(0)-506(n−1).

The encrypted blocks 506 form the contents of the unnamed data stream 402 in file 400. That is, the data stream 402 contains encrypted blocks $E_{h(Fi)}(F^i)$ for all i from 0 to the size of the file in pages minus one. Nothing else goes in the main stream.

Metadata Stream 404

Returning to FIG. 4, the metadata stream 404 of the file 400 stores metadata used to describe the contents of the file and to decrypt the file. The metadata stream 404 contains a header 406, a tree structure 408, and some per user information 410.

Header 406

The header 406 contains information pertaining to the file and which may be used to validate the file. In FIG. 4, the header 406 is illustrated as including such file information as a file number 412, a revision number 414, a hash value 416 of the root of tree structure 408, and an optional digital signature 418.

Exemplary implementations of the header will be described according to three different file formats, each of which possess different advantages. The three formats include a signed format, an unsigned format, and a delegation format. The signed format contains a digital signature 418 associated with the file and information used to verify the signature. The unsigned file format omits the digital signature and verification information. The delegation format accepts delegation certificates to convey ownership or privileges with respect to the file. The signed and unsigned formats are described immediately below, while the delegation format is described further along in this discussion beneath the heading "File Format Using Delegation Certificates".

With the unsigned format, the directory servers send a hash value that represents the contents of the file (as well as its metadata) to a verifying machine for verification of the file contents. In this implementation, there is no way for the verifying machine to determine that a particular user wrote a file, aside from trusting the directory servers. The advantage of this approach is that there is no need to compute or verify digital signatures for the file, which can be computationally expensive. The disadvantage is that the verifying machine must trust the directory servers, although this is less of a problem than it might seem on its face. Even with the signed format, where it is possible to verify that a particular user wrote a file without trusting the directory servers, one still relies on the directory servers to verify that the correct version of the file is present (as opposed to a different file or a old version of the correct file), and to state which user(s) are allowed to sign a particular file. In practice, corrupt directory servers could do much damage even with signed files, so electing to use unsigned files and dropping the signatures saves computational cost at a slight increased risk of reliance on the directory servers.

The following example header contains fields common to all three formats. Fields marked with (SF) exist only in the signed format that uses signatures.

```
ULONG            MagicNumber;         (must be 0x0fa2317e)
UCHAR            FormatVersionMajor;  (1 described here)
UCHAR            FormatVersionMinor;  (1 described here)
USHORT           Flags;               1 means alternate signature type
                                      2 means short header format
GUID             FileId;
FILE_USER_NAME   FileOwner;
Time             FileCreateTime;      E.g., 64 bit NT time
Time             FileModifyTime;
LONGLONG         FileRevisionNumber;  (SF)
FILE_USER_NAME   LastWriter;
LONGLONG         FileSize;
LONGLONG         FragmentOffset;
LONGLONG         FragmentSize;
ULONG            UserKeyCount;        The number of KEY_ID_PAIRS
ULONG            FilePageSize;
ULONG            BytesPerTreeBlock;
USHORT           PublicKeyAlgorithm;  1 is RSA, others undefined
USHORT           HashAlgorithm;       1 is SHA, 2 is MD5
USHORT           SymmetricAlgorithm;  1 is RC4, 2 is RC2
USHORT           SymmetricKeySize;
USHORT           SignatureSize;       (SF)
LONGLONG         KeyPairOffset;       File offset of the KEY_ID_PAIRs
LONGLONG         KeyDataOffset;
LONGLONG         SignatureOffset;     (SF) The file offset of the sig
@ SignatureOffset: (SF)
    <Signature List, signed by the LastWriter, size SignatureSize>
@ KeyPairOffset:
    KEY_ID_PAIR UserKeys[UserKeyCount];
@ KeyDataOffset:
    The key data, as described below.
```

The MagicNumber field characterizes the type of header. Two FormatVersion fields describe the format version of the encrypted file itself and are intended to be used to allow an on-disk format to evolve over time. If the distributed file system 150 encounters a newer FormatVersionMajor than it presently understands, the file system is unable to understand the file. The file system ignores FormatVersionMinors that are too big and treats the format as if it were the newest understood by the file system and consistent with the FormatVersionMajor.

The Flags field contains a first flag to differentiate between whether the signed format or the delegation format is employed. The Flag field also contains a second flag to differentiate between a short header form and a long header form. If the second flag is set to indicate a short header form, the rest of the header after the FileModifyTime field uses the following format rather than the one presented above:

```
USHORT   FileRevisionNumber;   (SF)
USHORT   FileSize;
USHORT   SignatureSize;        (SF)
<Signature List, signed by the FileOwner, size SignatureSize> (SF)
<A single KEY_ID_PAIR goes here>
```

The short header form is intended for small files (typically 4K or less, although they can be as big as 64K). The conditions in which the short header form can be used are:

The LastWriter and FileOwner are the same;

There is only one key-id pair entry;

The file uses RSA/SHA and constant size (e.g., 128-bit) symmetric keys;

The revision number fits in a USHORT in the signed format case; and

Employs a single file encryption/cleartext hash (as is done with files that are less than or equal to one file page size in the normal format).

The short header form is intended for the extremely common case of very small files that are created once and rarely (or never) overwritten, and readable by either everyone or just the creator. This may be as many as half of all files. The short header form is incompatible with the delegation format, but since these files are created in one piece and then left alone and the delegation format is intended to address in-place updates, the incompatibility is not a problem. The distributed file system is free to decide whether to use the short or long header form for any particular file, and can switch formats on the file (assuming that it has access to the writing user's key).

The FileId field contains the file number in the form of a globally unique ID. The FileOwner field identifies the file owner, the FileCreateTime field specifies the time of file creation, and the FileModifyTime field specifies the last time the file was modified. The FileRevisionNumber field, which is only present in the signed format, is updated every time a file is written, closed, and signed (i.e., not for every write to the file). The directory servers will know what the 11 latest revision of a file is.

The LastWriter field notes the last user to write to the file. This user is also the one who issued the signature for the file contents stored at the offset held in the SignatureOffset field. The type FILE_USER_NAME that is used for the s5 LastWriter and FileOwner fields supports two globally unique identifiers, one for the user and one for an authority that certifies the identity of the user, although there are a number of other possibilities for user names, including a hash of the user's public key. The FileSize field describes the size of the entire file, while the FilePageSize field specifies the size of each page in the file.

The FragmentOffset and FragmentSize fields are intended to support very large files that have been broken into fragments to make them more manageable by the replica placement and regeneration systems. As one example default, the FragmentOffset field is set to zero and the FragmentSize field equals FileSize.

The PublicKeyAlgorithm field specifies a suitable public key cipher, such as RSA. The HashAlgorithm field identifies a suitable hash algorithm, such as SHA or MD5. The SymmetricAlgorithm field specifies a suitable symmetric cipher, such as RC2 or RC4, and it employs keys of a size specified in the SymmetricKeySize field (e.g., 128 bit).

The KeyPairOffset field contains an offset value to a location in the metadata stream that holds the key ID pairs (per user information 410). The KeyDataOffset field contains an offset value to a location in the metadata stream where the tree 408 is located.

Tree Structure 408

The tree 408 is the portion of the metadata stream 404 that facilitates indexing into individual blocks in the data stream 402, thereby enabling data verification of the contents in the data stream. The tree contains data for two purposes: (1) allow a user to decrypt the file one block at a time and out of order, and (2) allow data servers to verify that the contents of the file is genuine one block at a time and out of order and without having access to the keys of any of the authorized readers of the file. In this manner, the tree 408 allows the distributed file system 150 to verify individual encrypted blocks 506 directly, without decryption and without any knowledge of the encryption keys used to encrypt the file.

Figure 6:
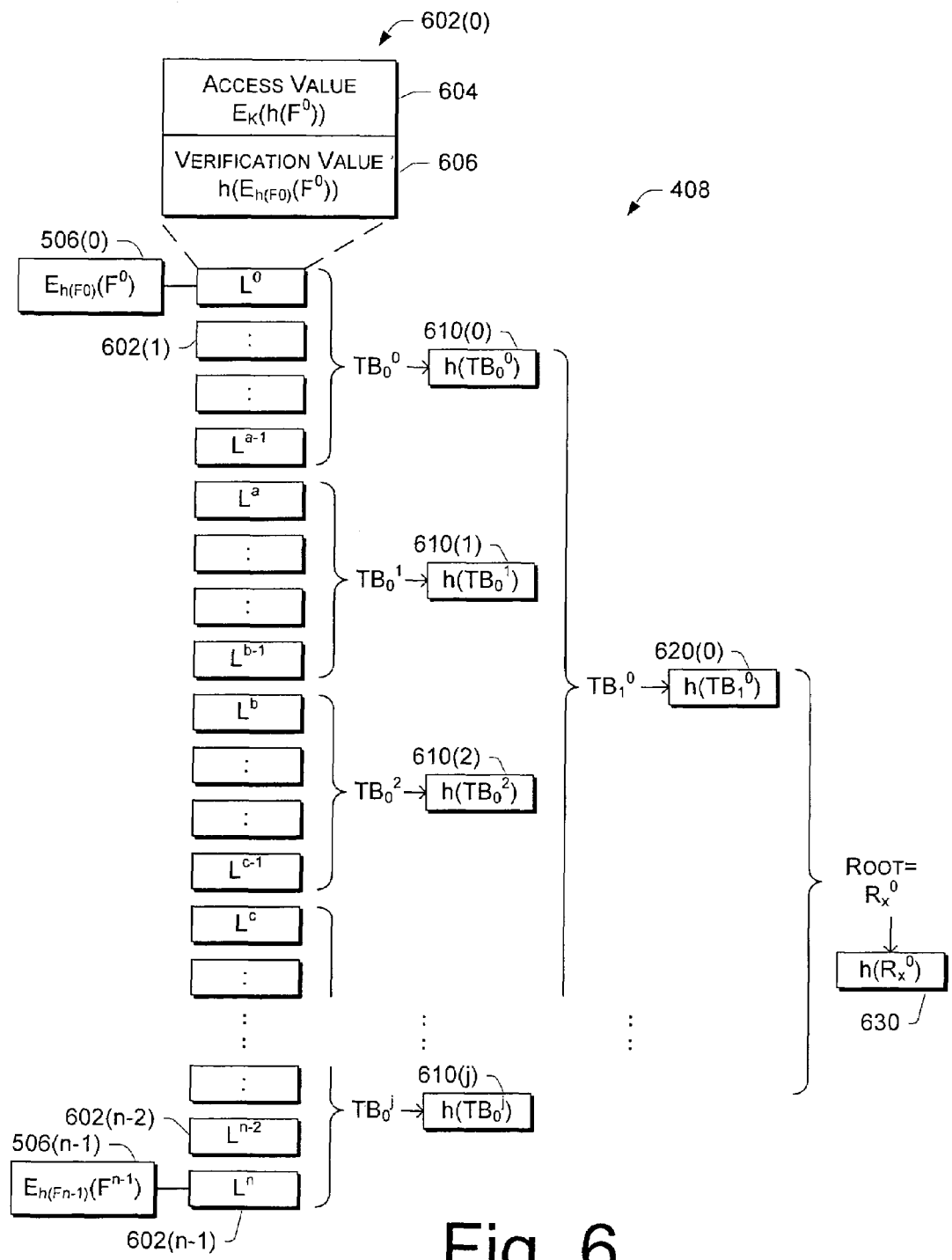
FIG. 6 shows an indexing structure to index the file segments. The indexing structure forms part of the metadata stream.

FIG. 6 shows a tree structure 408 in more detail. There are two types of entries in tree 408: leaf entries and higher-order entries. They differ in that the decryption keys are held only in the leaf entries, while both the leaf entries and the higher-order entries contain hashes that are used to determine whether the file contents are correct.

In FIG. 6, the tree 408 defines leaf nodes 602(0)-602(n-1) for each of the corresponding encrypted blocks 506(0)-506(n-1). Each leaf node $L^i$ contains two components: (1) an access value 604 used for decrypting the corresponding block and (2) a verification value 606 used for verifying the corresponding block. In the illustrated implementation, the access value 604 is formed by encrypting a hash of the cleartext file block using a symmetric cipher E and a randomly generated key K, or Access Value=$E_K(h(F^i))$.

The symmetric cipher specified in the SymmetricAlgorithm field of the header is used for this encryption (e.g., RC2 or RC4).

The verification value 606 is created by hashing the associated encrypted block, or:

Verification value=$h(E_{h(Fi)}(F^i))$.

A leaf entry possesses the following format:

```
BYTE      EncrypyedCleartextHash[HASH_SIZE];
BYTE      UnencryptedCiphertextHash[HASH_SIZE];
``` where EncryptedCleartextHash is the access value 604 and the UnencryptedCiphertextHash is the verification value 606. The HASH_SIZE value depends on the HashAlgorithm specified in the header 406. For the SHA algorithm, it is 20 bytes and for the MD5 algorithm, it is 16 bytes. When RC2 encryption is used for the EncryptedCleartextHash, the size is 24 bytes due to padding, regardless of which hash algorithm (MD5 or SHA) is used.

The existence and size of the tree 408 varies with the size of the file. At one extreme, if the file is less than or equal to one page in size, there is no tree and no per-file secret key K. Instead, the cleartext hash value is turned into a key, encrypted with the public keys of the readers, and stored in the FILE_KEY_ID_PAIR. The hash of the file (that is stored at the directory servers or signed and placed in the file) includes the entire contents of the ciphertext of the file in place of the hash of the highest level that exists in the tree. Since about half of all files are smaller than 4K, this optimization can be significant.

For slightly larger files, the tree may be one level deep, containing only the leaf nodes 602 and one root node formed from the leaf nodes. As a general rule, if the count of pages in a file is greater than one but less than a moderate value obtained by dividing the BytesPerTreeBlock by the leaf entry size (i.e., approximately 3.2 Mbytes for SHA, 4K file pages and BytesPerTreeBlock of 32 Kbytes), the tree 408 only contains leaf nodes and no higher order entries. The number of leaf nodes 602 is sufficient to contain enough entries to describe all of the pages in the file. For the signed format case, the LastWriter signs the header, the per user information, and one or more verification values from the tree, as described in more detail below. In the unsigned format case, the directory servers, store the hash that the LastWriter would have signed.

For large files, the cost of computing the hashes can be quite high. For example, for a 500 Mbyte file (e.g., an email file) and 4 K file pages, there are approximately 128,000 hashes. At twenty bytes per hash, a single block update to this file would require 2.5 MB of hashing.

To reduce the amount of work for small writes to large files, the tree may be configured with one or more intermediate levels of hashes. In FIG. 6, the leaf nodes 602 are grouped into tree blocks (e.g., denoted as $TB_0^0$ to mean tree block 0 at tree level 0). The size of a block is specified in the BytesPerTreeBlock field in header 406. If the block size does not divide evenly by the size of a leaf (or higher order) entry, the block is padded with zeroes after the last complete entry.

The tree block is hashed using a one-way hashing function to form intermediate nodes 610(0)-610(j). A higher order intermediate node has the following format:

BYTE HashOfLowerorderEntry[HASH_SIZE];

Each hash is of an entire block of the next lower level of the tree, excluding any trailing padding and excluding the unused portion of the final leaf block. The first higher order block follows the first complete leaf tree block. Unlike the leaf tree blocks, the higher order blocks are allocated as a whole because if there is a higher order block, there is also a leaf tree block following it. By allocating the whole block, the system avoids having to move the whole structure around to expand the file. Using the example parameters from above, a first higher order block is not used until the file is approximately 3.2 MB. Thus, the maximum wasted space for a higher order block is 1% (32 Kb/3.2 MB), which is on the order of the cost of the leaf tree entries.

The array of intermediate nodes 610 can again be grouped into blocks (e.g., denoted as $TB_1^0$ to mean tree block 0 at tree level 1) and each block is hashed to form the next level of nodes represented by node 620(0). The grouping and hashing process can be repeated as many times as desired until reaching a tree root, which is denoted as $R_x^0$. After the first higher order block follows more leaf tree blocks until all of the entries in the higher order block are filled, at which time follows another leaf block and the next higher order block, followed by the rest of the leaf blocks for the second higher order block, the first leaf block for the third higher order block, the third higher order block, and so on. It is noted, however, that the second higher order block is rarely used since it typically is introduced for very large files of approximately 5.2 GB or greater (using the example parameters).

The layout has the following recursive definition, in which the superscripts are eliminated for clarity:

$C_0 = L$ $C_x = C_{x-1} H_x C_{x-1} C_{x-1} \ldots C_{x-1}$ where $H_x$ indicates an $x^{th}$-order higher-level block. So, the layout of the data in a two-level tree is as follows:

$L^0 H_1^0 L^1 L^2 \ldots L^{n-1} H_2^0 L^n H_1^1 L^{n+1} \ldots L^{2n-1} \ldots$ where n is the number of entries in the higher order block.

The tree root is then hashed to form the root node 630, or $h(R_x^0)$. This hash value may then be hashed together with the metadata header 406 and per user information 410 and the resulting hash stored at the directory servers in the case of the unsigned format, or signed using a user's signature in the signed format case. In this way, the hash or signature covers the higher order blocks (of the highest order that exists in the file) and thereby indirectly covers the leaf blocks. The signature covers the used entries in the higher order blocks, not the unused entries and padding. Similarly, the hash entry in the higher order block of the final leaf block does not include any unused entries/padding in that leaf block.

With this tree structure, every small update to the file merely involves changing the file block, the leaf node associated with the file block, and the nodes in the tree branch to the leaf node. This solution reduces the hashing cost because the number of upper-level hashes that need to be modified for any given write grows logarithmically in the size of the file. Therefore, with the hash tree, any work to update a particular byte of the file is proportional to the depth of the tree, which grows with the log of the size of the file.

It is noted that although a multi-level tree index is described herein as one possible implementation, other forms of indexing structures may be used.

User Key List

To grant access privileges to multiple users, the file system 150 maintains a user key list for each file. Each entry in the user key list contains the data used by specific users to decrypt the file. More particularly, the randomly generated key K, which is used to encrypt the hash of the blocks of the cleartext file F (i.e., forming the access value 604), is encrypted using each authorized user's public key and stored in a user key list, or $E_{UiPubKey}(K)$.

Figure 7:
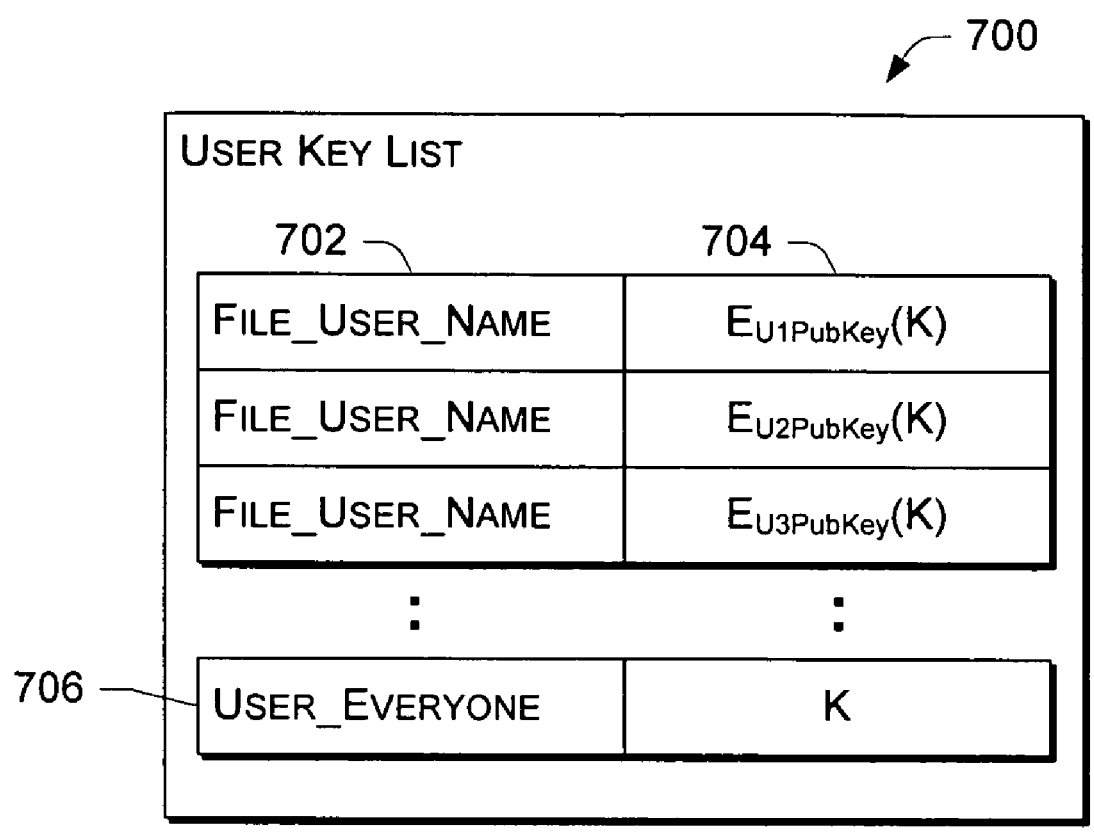
FIG. 7 illustrates a user key list that identifies users with privileges to access the file.

FIG. 7 illustrates a user key list 700 for the file F. Each entry in list 700 includes a user name 702 of the user with access privileges and the encrypted symmetric key 704. If the file is publicly readable, the key list 700 contains only a special entry 706, in which the FILE_USER_NAME is the reserved value USER_EVERYONE to indicate that everyone has access, and the associated encrypted key segment contains the key data in the clear.

Each entry in the key list 700 has the following format:

FARSITE_USER_NAME    UserName;
ULONG                EncryptedKeyBlobSize;
BYTE                 EncryptedKeyBlob[EncryptedKeyBlobSize];

The content of the EncryptedKeyBlob field depends on the size of the file. If the file is one page or less in size, the field contains the key derived from the hash of the cleartext of the file, encrypted with the public key of UserName. If the file is bigger than one page, the field contains the random symmetric key K that was used to encrypt the hashes of the cleartext of the file in the leaf tree block(s), also encrypted with the public key of UserName.

There are two different types of signatures for a file, depending on how the file is written. In the signed format, the file is signed by the user who is named in the LastWriter field. The signature covers the file header (up to and including the SignatureSize), but does not cover the three offsets so that servers can re-arrange pieces of the Metadata$ stream as they see fit, without having the last writer's key. After the header, the signature then covers the key-id pairs. Following that, it covers either the file ciphertext, the single leaf tree block, or the highest order tree block, depending on the file's size. In the signed format, all that is stored at SignatureOffset is the actual signature blob.

For small files, the user key list 700 does not contain entries with encrypted symmetric keys. Instead, each entry contains a user name (i.e., FILE_USER_NAME 702) and an encrypted version of the hash of the entire file (i.e., h(F)), which is encrypted using the user's public key. Accordingly, this portion of the entry would resemble $E_{UipubKey}(h(F))$.

Since files are stored on machines that are not trusted, read access cannot be sufficiently controlled merely by listing the authorized readers of a file in the metadata, as is commonly done in trusted file systems. Thus, this file format relies on cryptography to provide access security. Only a truly authorized user with knowledge of an appropriate private key will be able to recover the access key K. As a result, an impostor who attempts to recover the key K using an authorized user's name will be unable to decrypt the access key K because that impostor does not have knowledge of the user's private key.

An alternative technique may be used in the case where the user creating the file (i.e., the user who makes up K) is the same as the user in the user key list 702. In this case, a secret symmetric key that is known only by that user can be used in place of that user's public key $U_{iPubKey}$. Since symmetric key operations are substantially cheaper than public key operations in terms of computational resources, creating and reading the file would be computationally cheaper in the common case that the file creator is the same as the file reader.

File Format Using Delegation Certificates

The third type of file format (in addition to the signed and unsigned formats) is one in which delegation certificates are used in place of digital signatures. Setting the first flag in the Flags field of the header 406 signifies the delegation format. The delegation format is used to handle a case where a machine crashed while in the process of writing a file, before the last writer signed that file. With this format, a user's machine may create a delegation certificate allowing other entities to verify as a group the authenticity of the file on behalf of the user in the event the user's machine is unavailable to make the verification.

When a computing device attempts to write a file to the distributed file system 150 and receives a write lock for a file or directory, the computing device generates a random symmetric key, known as the "lock-secret" key. The computing device uses secret sharing to break the lock-secret key into multiple pieces, one piece for each of the directory servers, with a specified number of the servers being sufficient to recover the key.

If the computing device wants to commit updates to a file without attaching a full signature to the file (such as on a write-through write to a database file), the computing device generates a delegation certificate and signs the certificate with the user's private key. When the computing device updates a file, it computes the hash of the file that would normally be signed with the writer's private key. However, instead of signing the update, the computing device encrypts it with the lock-secret key using the symmetric signature algorithm specified in the file header.

If a machine crashes with file updates that are signed with the symmetric signature key (rather than with the normal private-key signature), there will be a set of files signed by lock-secret keys on recovery. For each particular lock-secret key, the computing device takes all files signed by that key and sends the delegation certificates and "symmetric key signatures" to all available directory servers. Once the directory servers have collected all of the appropriate data, they break the seal on the lock-secret key and determine whether the hash of the lock-secret key matches the hash in the DelegationCertificate field. The directory server then decrypt the symmetric key signature (i.e., decrypt the file hash with the lock-secret key) and fill out and sign a DelegationCountersign using the decrypted file hash.

In the delegation format, the following structure is stored at the SignatureOffset field of the header:

```
LONGLONG                DelegationCertificateOffset;
LONGLONG                DirectoryServerSignaturesOffset;
@ DelegationCertificateOffset is:
   ULONG                Magic;                          (must be 0xde11ca7e)
   UCHAR                FormatVersionMajor;             (1 described here)
   UCHAR                FormatVersionMinor;             (1 described here)
   USHORT               HashedKeySize;
   Time                 DelegationTime;
   GUID                 FileId;
   GUID                 DelegationCertificateId;
   LONGLONG             FileVersionNumber;
   FILE_USER_NAME       LastWriterName;
   ULONG                DirectoryServerCount;
   ULONG                NumDirectoryCOuntersignsNeededForValidity;
   FILE_MACHINE_NAME    DirectoryServer[DirectoryServerCount];
   ULONG                SignatureSize;
   <a hash of the secret "signature" symmetric key, of HashedKeySize, using
   the hash algorithm specified in the file header>
   <the signature blob of the LastWriter >
@ DirectoryServerSignatureOffset is:
   ULONG                CountOfSigningDirectoryServers;
```

```
for each signing server there is a DelegationCountersign:
    ULONG                    Magic              (must be
0xc2a38452)
    UCHAR                    FormatVersionMajor;  (1 described here)
    UCHAR                    FormatVersionMinor;  (1 described here)
    USHORT                   HashSize;
    FARSITE_MACHINE_NAME     SigningMachine;
    GUID                     FileId;
    GUID                     DelegationCertificateId;
    LONGLONG                 FileVersionNumber;
    Time                     CountersignTime;
    ULONG                    SignatureSize;
    <A hash for the file contents, computed just as the hash that the
    last writer would sign in the normal signature method, of
    HashSize>
    <A signature of the directory server certificate up to but not
    including SignatureSize, followed by the file contents hash>
```

The signature in the delegation certificate covers everything from the Magic field up to but not including the SignatureSize field, and then the hash of the secret symmetric signature key. The signature of the directory servers is over what would have been signed by the user identified in the LastWriter field in the signed format case. Note that there is a separate SignatureSize for each of the directory servers, since they may have different key lengths and so different signature lengths.

To validate a file using the delegation format, the verifying computer first evaluates the signature on the delegation certificate and confirms that the certificate has the correct FileId and FileVersionNumber. It then counts the number of valid DelegationCountersign's, and if that number is at least NumDirectoryCountersignsNeededForValididty then the file is valid.

To check a DelegationCountersign, the verifying computer verifies that SigningMachine is on the list in the DelegationCertificate, that the FileId, FileVersionNumber and DelegationCertificateId match the DelegationCertificate, and that the hash value is the same as the hash value that would have been signed by the last file writer in the normal signed file format.

There is a related technique for the non-signature case. As before, when a computing device attempts to write a file to the distributed file system 150 and receives a write lock for a file or directory, the computing device generates a symmetric encryption key called the "lock-secret key." The computing device breaks the lock-secret key into multiple pieces and distributes the pieces to the directory servers using a cryptographic secret sharing technique.

If the computing device subsequently wants to commit updates to a file without attaching a signature, the computing device encrypts the updates with the lock-secret key using the symmetric encryption algorithm specified in the file header. If the directory servers are satisfied with the result, the servers accept the file contents as being valid and update their internal data structures. In this case, the process of producing a delegation certificate and countersigning certificate are eliminated.

File Construction

Figure 8:
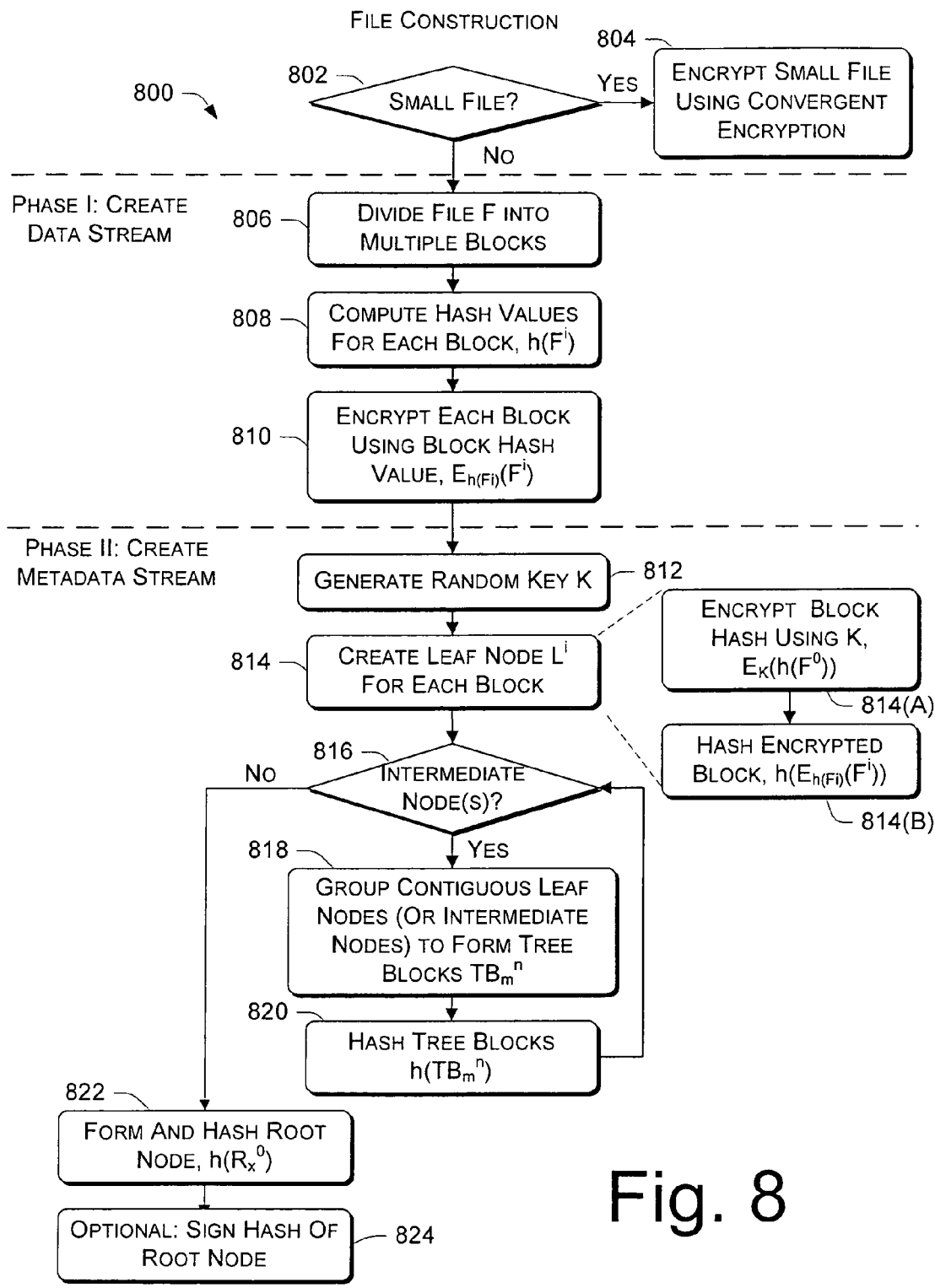
FIG. 8 is a flow diagram of a process for constructing a file according to the file format of FIG. 4.

FIG. 8 shows a process 800 for constructing a file according to the format shown in FIGS. 4-7 for storage in the distributed file system 150. The process can be implemented in software as computer executable instructions that, when executed, perform the operations depicted in blocks. The process 800 will be described with reference to components in the computing device 200 shown in FIG. 2 as exemplary mechanisms for performing the operations, and with reference to the file format illustrated in FIGS. 4-6.

The file construction process 800 builds files differently depending upon their size. Accordingly, at operation 802, a preliminary inquiry is to ascertain the size of the file. If it is a small file (e.g., 4K or less), the storage/retrieval control module 220 of the client component 204 encrypts the entire file using convergent encryption techniques (operation 804).

Alternatively, assuming the file is not small (i.e., the "no" branch from operation 802), the control module 220 proceeds to a technique for constructing a large file for storage in the distributed file system. Large file construction can be conceptualized as two phases: a first phase for creating the data stream 402 and a second phase for creating the metadata stream 404.

In the first phase, the control module 220 employs the segmenter 222 to divide a file F into "n" multiple blocks 502(0)-502(n-1) at operation 806. Each block contains a portion of the file, which is illustrated as file segments $F^0, F^1, F^2, \ldots, F^{n-1}$ in blocks 502. At operation 808, the control module 220 invokes the hash module 226 to hash each block 502(0)-502(n-1) to produce intermediate hash values h($F^i$). At operation 810, the control module 220 calls the cryptographic engine 224 to encrypt each block 502(0)-502(n-1) using that block's hash value, or $E_{h(Fi)}(F^i)$. In practice, the hashing and encrypting operations may be accomplished sequentially for each block, one block at a time, before proceeding to the next block. For instance, for each block, a loop may be used to compute the hash of the block, encrypt the result, and then proceed to the next block. With this approach, the two accesses to the block are close together in time, which increases the likelihood that the data for the block will be found in the cache and so be faster to perform. The segmented and encrypted file can then be stored as the unnamed data stream 402.

During the second phase, the control module 220 uses the tree builder module 230 to construct the block-level access tree. At operation 812, the tree builder 230 (or other module in the client component) generates a random K for the entire file. The tree builder 230 then creates a leaf node $L^i$ for each block 502(0)-502(n-1) (operation 814). Each leaf node $L^i$ contains two components: (1) an access value 604 used for decrypting the corresponding block and (2) a verification value 606 used for verifying the corresponding block. Accordingly, operation 814 can be viewed as two parts. At the first part represented by operation 814(A), the tree builder 230 computes the access value by encrypting the file segment hash h($F^i$) using the key K, or $E_K(h(F^i))$. At the second part represented by operation 814(B), the tree builder 230 computes the verification value by hashing the corresponding encrypted file segment, or $h(E_{h(Fi)}(F^i))$.

At operation 816, the tree builder 230 ascertains whether the tree structure would benefit from an intermediate level of nodes in terms of access and verification efficiency. The number of levels in the tree generally depends on the size of the file and the desired fan-out. For a smaller file (e.g., a file that is greater than 4 KB but less than 3.2 MB), the tree is one level deep, containing only the leaf nodes. For a larger file (e.g., one that is greater than 3.2 MB), another level of nodes is added to enable more efficient access of the leaf nodes.

If another level of nodes is desired (i.e., the "yes" branch from operation 816), the tree builder 230 groups sets of contiguous leaf nodes to form tree blocks $TB_m^n$ (operation 818). Then, at operation 820, each tree block is hashed to form intermediate tree nodes 610(0)-610(j). The process continues at operation 816, where the tree builder 230 again determines whether a further level of intermediate nodes would prove useful. If the file is very large (e.g., greater than 5.2 GB), the tree might include a second level of intermediate nodes. In this case, operations 818 and 820 are repeated such that the intermediate nodes in the first level are grouped together to construct a second level of tree blocks (block 818) and each tree block is hashed (block 820). Depending on the file size, this process is repeated as many times as needed until the highest-level node contains only one block.

Once an effective node structure is created and no more intermediate nodes are desired (i.e., the "no" branch from operation 816), the tree builder 230 forms the root $R_x^0$ and hashes it to form a hash value $h(R_x^0)$ (operation 822). In the case of the signed format, the control module 220 invokes the signing/verification module 228 to sign the file header 406, per-user information 410 and root node $h(R_x^0)$ with the digital signature of the user identified in the LastWriter field (operation 824). The resultant tree structure 408 is stored in the metadata stream 404. The signature is stored in the header 406 of the metadata stream 404.

File Verification

Figure 9:
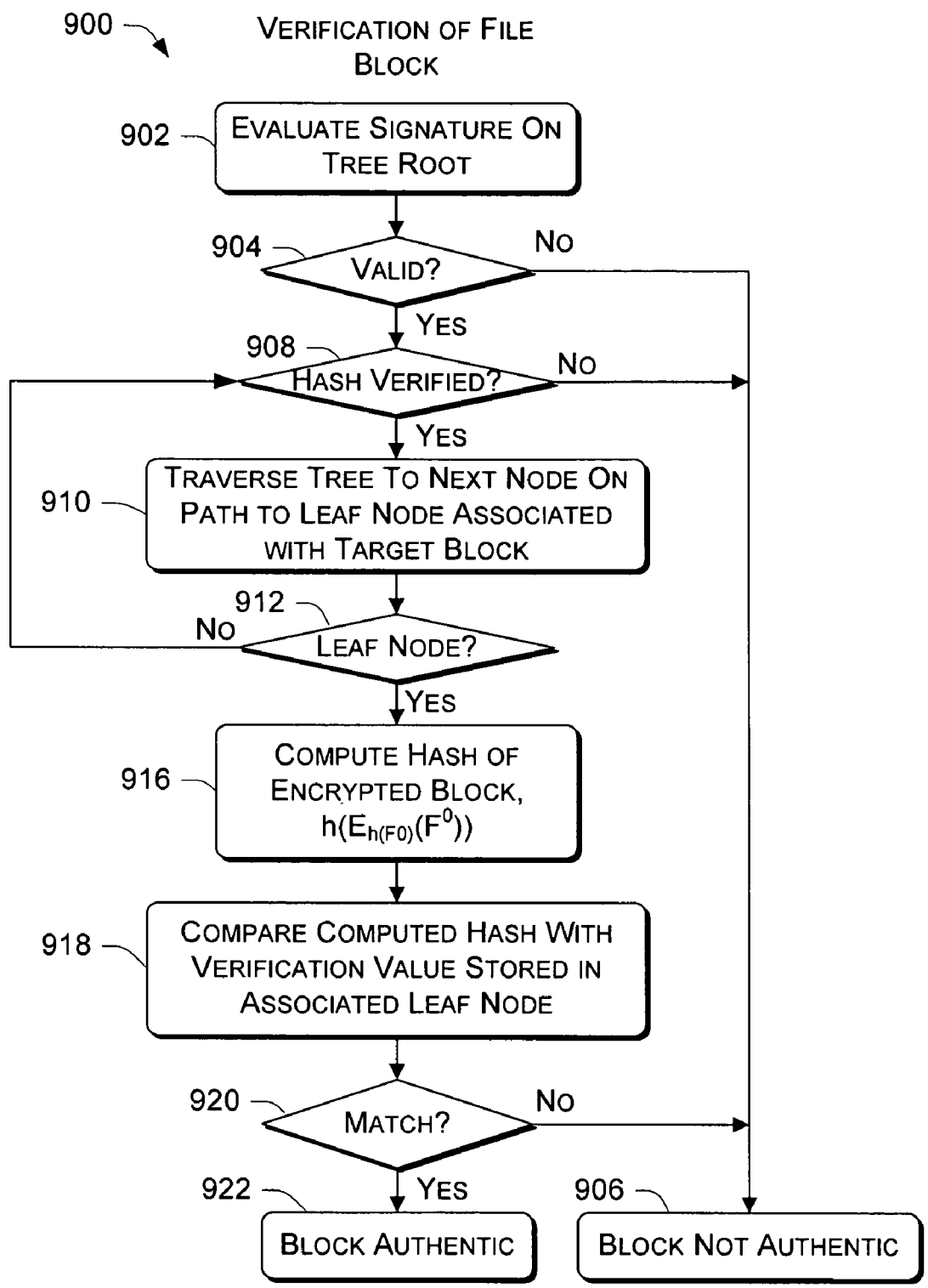
FIG. 9 is a flow diagram of a process for verifying individual blocks of the file.

FIG. 9 shows a process 900 for verifying portions of a large file in its segmented and encrypted form, without requiring knowledge of the user private keys or random keys. For discussion of this process, it is assumed that the file is of sufficient size to have a tree structure 408 stored in the metadata stream 404. The process 900 can be implemented in software as computer executable instructions that, when executed, perform the operations depicted in blocks. The process 900 will be described with reference to components in the computing device 200 shown in FIG. 2 as exemplary mechanisms for performing the operations, and with reference to the file format illustrated in FIGS. 4-6.

For discussion purposes, suppose that computing device 200 is a verifying machine that is tasked with verifying the first encrypted file block 506(0) for file segment $F^0$. At operation 902, the signing/verification module 228 evaluates the signature (if any) on the header 406, per-user information 410 and tree root of the tree structure 408 using the public key of the last writer as indicated in the header 406. The signature is held in the header 406 of the metadata stream 404. If the signature is not valid (i.e., the "no" branch from operation 904), the file block is deemed not to be authentic (i.e., block 906). In the non-signed embodiment, the signing/verification module 228 computes the hash that would have been signed in the signed format case, and compares that against the has provided from the directory servers. If the hash does not match, then it follows the "no" branch from operation 904.

Conversely, if the signature is valid (i.e., the "yes" branch from operation 904), the verification module 228 verifies whether the hash value stored at the root matches the hash of the lower-order nodes below the root in the tree (i.e., operation 908). If the values do not match, the file block is not authentic (i.e., operation 906). If the hash is verified (i.e., the "yes" branch from operation 908), the verification module 228 traverses the tree, node by node, from the root to the leaf node $L^0$ associated with the target block 506(0). At operation 910, the verification module 228 moves to the next node on the path between the root and the leaf node. If the next node is not a leaf node (i.e., the "no" branch from operation 912), the verification module 228 verifies whether the hash value stored at the next node matches the hash of the lower-order nodes below that node in the tree (i.e., operation 908). In this manner, each node in the path from the root to the leaf node are evaluated. If any one of these verifications fails, the block is not authentic.

Once the leaf node is reached (i.e., the "yes" branch from block 912), at operation 916, the verification module 228 calls the hash module 226 to compute a hash of the encrypted file segment in target block, or $h(E_{h(F0)}(F^0))$. The verification module 228 then compares this resultant hash value with the verification value 606 stored in the corresponding leaf node $L^0$ (i.e., operation 918). If the two match (i.e., the "yes" branch from operation 920), the target block 506(0) is authentic (operation 922). If the two fail to match (i.e., the "no" branch from operation 920), the target block 506(0) is not authentic (operation 906).

Reading a File

Figure 10:
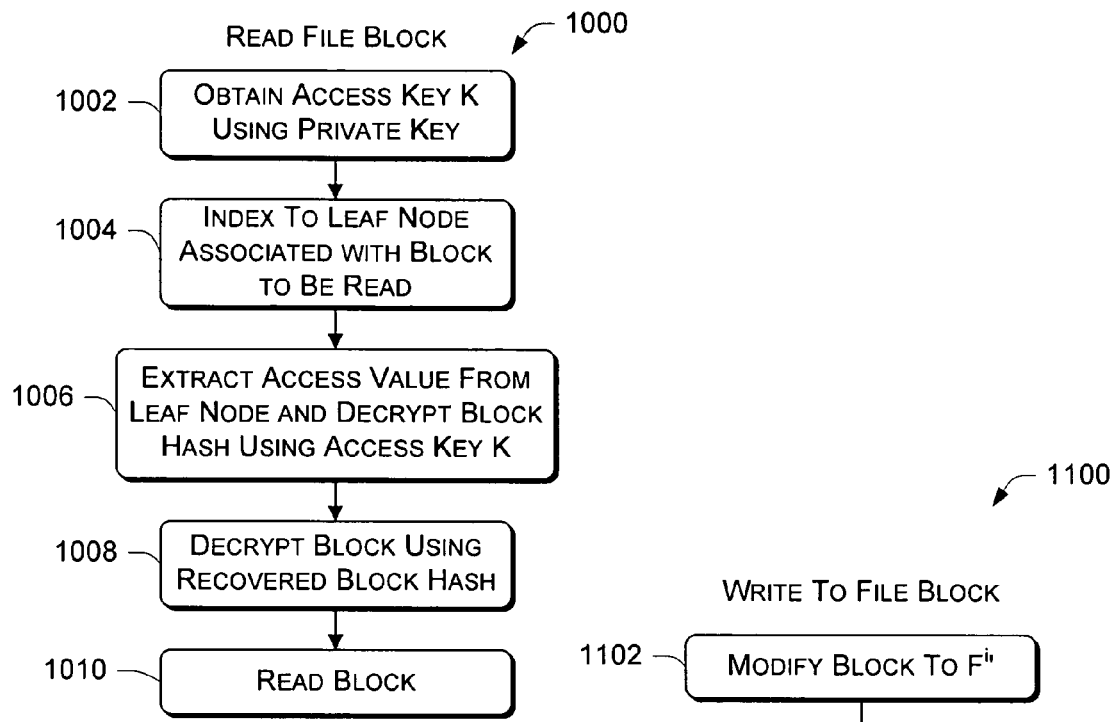
FIG. 10 is a flow diagram of a process for reading individual blocks of the file.

FIG. 10 shows a process 1000 for reading one of the file blocks of a large file without having to read the entire file. As before, it is assumed that the file includes a tree structure 408 and that the target block is a block $F^i$. The process 1000 can be implemented in software and will be described with reference to components in the computing device 200 in FIG. 2 and the file format in FIGS. 4-7.

At operation 1002, the storage/retrieval control module 220 obtains the random access key K from the user key list 700 by indexing into the list using the File_User_Name 702 of the user who wants to read the target file block. The control module 220 extracts the encrypted symmetric key 704 and decrypts the access key K using the public key cipher (e.g., RSA) and the user's private key. It is noted that if the user is not identified in the user key list 700, the user does not have access privileges to read the file and will be prevented from doing so. Additionally, an impostor attempting to recover the key K using the user's name will be unable to decrypt the access key K because that impostor does not have knowledge of the user's private key.

At operation 1004, the control module indexes into the first level of the tree structure 408 in the metadata stream 404 to the leaf node $L^i$ associated with the target file block $F^i$. At operation 1006, the control module 220 removes the access value 604 (i.e., $E_K(h(F^i))$) and calls the cryptographic engine 224 to decrypt the access value using the symmetric cipher D and the symmetric access key K to recover a hash of the target block, as follows:

$$D_K(E_K(h(F^i))) = h(F^i).$$

At operation 1008, the control module 220 calls again on the cryptographic engine 224 to decrypt the target file block using a symmetric cipher D and the recovered hash value as the key, as follows:

$$D_{h(Fi)}(E_{h(Fi)}(F^i)) = F^i.$$

The file block $F^i$ is now in an unencrypted format and ready to be read by the authorized user (i.e., operation 1010).

Writing a File

Figure 11:
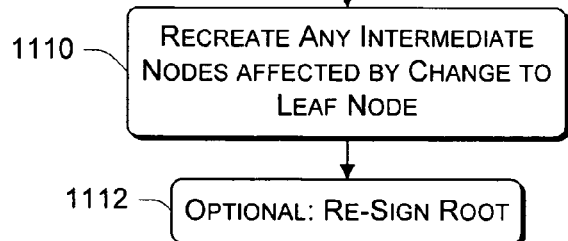
FIG. 11 is a flow diagram of a process for writing to a file block.

FIG. 11 shows a process 1100 for writing to or modifying one of the file blocks of a large file without affecting other blocks of the data stream. Once again, it is assumed that the file is of sufficient size to have a tree structure 408 stored in the metadata stream 404 and that the target block is a block $F^i$. The process 1100 can be implemented in software and will be described with reference to components in the computing device 200 in FIG. 2 and the file format in FIGS. 4-6.

At operation 1102, the computing device modifies a portion of the file contained in block $F^i$, to create a file block $F^{i\prime}$. Modifying the data renders the previously computed hash value inaccurate and hence unusable. Accordingly, at operation 1104, the control module 220 calls the hash module 226 to compute a new hash value of the modified block, or $h(F^{i\prime})$. At operation 1106, the control module 220 calls the cryptographic engine 224 to encrypt the modified file block $F^{i\prime}$ using the new hash value, or $E_{h(F^{i\prime})}(F^{i\prime})$. The new encrypted block replaces the pre-modified encrypted block in the data stream 402.

These changes to the file block also affect a portion of the tree structure 408 stored in the metadata stream 404. At operation 1108, the tree builder 230 recreates a new leaf node $L^{i\prime}$ that is associated with the modified block. The tree builder also recreates any intermediate nodes that reference the new leaf node (either directly or indirectly) as well as the root node (i.e., operation 1110). At operation 1112, the tree builder optionally re-signs the header 406, per-user information 410 and root using the last writer's signature, or using the lock-secret key technique described above.

Signed Manifest of File Modifications

In the signed form of the file format, a digital signature is applied to the header 406, per-user information 410 and root node after every modification to the file. This is illustrated, for example, as operation 1112 in the file write process 1100 of FIG. 11. The advantage of the unsigned file format over the signed file format is that the writer of a file does not need to compute a digital signature when closing the file after writing to it. Since digital signatures are computationally expensive, this can be a significant savings if file writes are performed frequently. When using the unsigned file format, instead of signing the file, the writer merely sends the file's hash value to the directory servers that implement the directory in which the file is stored. When another machine wishes to verify the contents of a file, it cannot check a signature in the file, since there is no signature in the file to check. The verifying machine thus needs to obtain verification information from some source that is external to the file.

One such source is the directory servers that implement the directory in which the file is stored. Since the directory servers store a copy of the file's hash value, they can provide this value to the verifying machine, and the verifying machine can compare this stored hash value to the computed hash value of the file. The disadvantage of this approach is that it requires contacting and trusting the directory servers. The trust issue is not particularly important, since the directory servers already have to be trusted with version information and writer authorizations. However, contacting the directory servers for every file verification can place a significant additional load on these machines, so it is beneficial to avoid this contact if possible.

Therefore, the present invention includes a mechanism by which the writer of a file can provide file authentication information to a verifying machine without having to compute a new digital signature every time a written file is closed.

Periodically, the writer compiles a list of the hash values of all files that have been written over a recent interval, computes a hash of the list, and signs the hash. This signed list of hash values is known as a manifest, analogous to a shipping manifest that enumerates the items in a shipment. The advantage of using a signed manifest that the writer need only perform a single signature computation in order to authenticate the writes to multiple files, rather than having to compute a separate signature for each file, as it would for the signed file format.

The writing machine can then send the signed manifest, along with one or more of the files that have been written, to a machine that wants a copy of the files. The receiving machine can verify that the signature of the hash of the manifest is valid, that the hash of manifest is valid, and that the file hash in the manifest corresponds to the hash of the file that it is interested in. The verifying machine needs to know the list of authorized writers to the file, which it must obtain from the directory servers, but this list is generally not modified as frequently as the contents of the file, so the load on the directory servers from propagating updates to the authorized writer list is significantly lower than the load from providing a hash value for every new version of a file.

Figure 12:
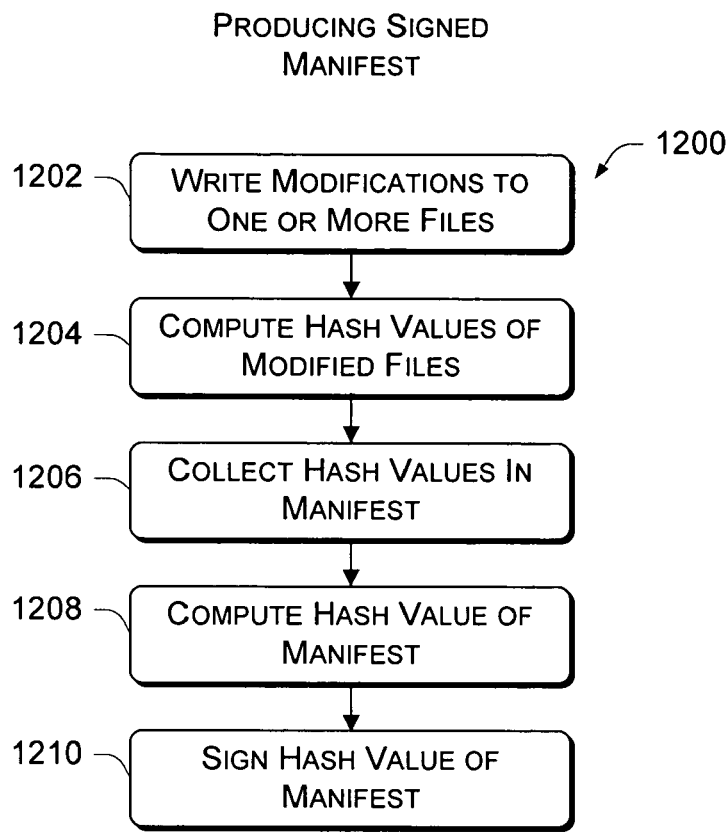
FIG. 12 is a flow diagram of a process for producing a signed manifest of changes made to one or more files.
Figure 13:
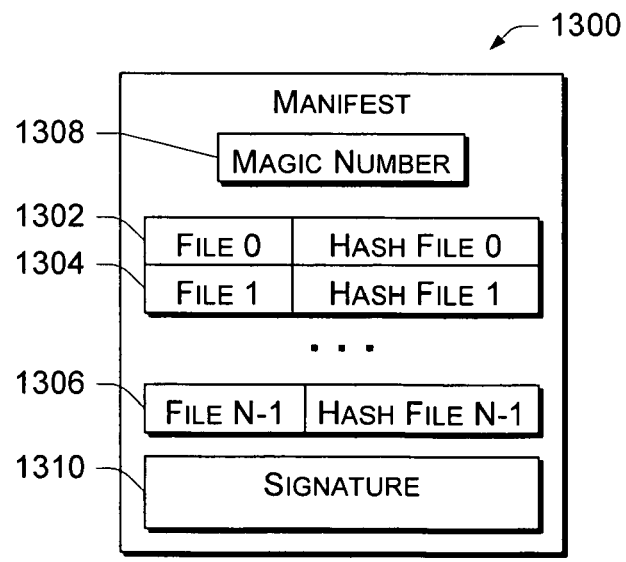
FIG. 13 illustrates a signed manifest and exemplary contents therein.

FIG. 12 shows a process 1200 for producing a signed manifest of modifications, and FIG. 13 illustrates an exemplary signed manifest. The process 1200 can be implemented in software and will be described with reference to components in the computing device 200 in FIG. 2 and the exemplary signed manifest in FIG. 13.

At operation 1202, the computing device modifies one or more files. This step is typically performed separately for each file, and depending upon the file size and the scope of the modifications, the control module 220 may invoke one or more of the segmenter 222, the crypto engine 224, the hash module 226, and the tree builder 230 in order to update the file metadata. At operation 1204, the control module 220 calls the hash module 226 to compute a new hash value of each modified file. This step is typically performed separately for each file and in conjunction with the writing of the new data to the file. The control module 220 collects the hash values of every modified file in a manifest (i.e., operation 1206).

FIG. 13 shows an exemplary manifest 1300. It includes a collection of entries 1302-1306 of modified files. Each entry contains both a file number (i.e., the file number 412 in the file header 406) and the hash of file. The file number specifies to which file a particular hash applies. Also, the manifest 1300 includes a magic number header 1308 at the beginning that helps ascertain what is being signed. This is a different magic number than the one found at the beginning of the file header.

After collecting a set of changes, the control module 220 invokes the hash module 226 to compute a hash of the contents of the manifest (i.e., operation 1208), and then it invokes the signing/verifying module 228 to sign the hash of the manifest using the last writer's private key (i.e., operation 1210). This is represented as the signature 1310 in FIG. 13, which covers the entire manifest. By signing the manifest, the file system can verify the user who modified the files in the manner outlined in the manifest. The timing as to when a manifest is created varies depending upon implementation requirements.

The manifest may be subsequently verified by initially verifying the signature 1310. If the signature is valid, the file hash contained in the manifest is compared to the hash of the file. If the two match, the verifier will then examine the revision number in the file. Action is only taken if the revision number in the file is bigger than the biggest revision number that the verifier has ever seen for that file. With this last evaluation, the verifier prevents malicious/malfunctioning machines from pushing stale versions of files to replica sites.

Sparse Files

A sparse file is a file whose logical size is greater than its physical size, potentially possessing large ranges with no data whatsoever. Such ranges are said to be "unallocated" as distinguished from "allocated" ranges that contain actual data. Logically, unallocated regions of a file contain zero data, but there is no physical storage associated with these regions. Sparse files are used in many different environments (e.g., database logging) and are known in the art. The file format described above can be used to support sparse files; however, it may consume an inefficiently large amount of storage space. This section describes modifications to the file format that greatly reduce this inefficiency. No fields are added, removed, or rearranged. However, for efficient handling of sparse files, a few changes can be made to the way values in certain fields are calculated.

If one were to store a sparse file using the file format 400 illustrated in FIG. 4, the allocated size of the metadata stream 404 will be proportional to the total size of the primary data stream 402 that includes vast ranges with no content (i.e., the logical file size), rather than proportional to the allocated size of the primary data stream that includes only the content portions of the sparse file (i.e., the physical file size). One significant case of sparse file usage is for circular logging using truncate-from-tail. With the file format 400, the metadata 404 would grow linearly as the log is written, but it could not be truncated as the log is truncated. Therefore, a file that is expected to be constant in size would actually grow linearly without bound.

The modifications described below adapt the file format so that (1) unallocated primary-stream plaintext is represented by unallocated primary-stream ciphertext, and (2) unallocated primary-stream data produces corresponding metadata of all zeroes, thereby enabling use of sparse file allocation for the metadata stream. The modifications may not completely eliminate the inefficiencies in allocation of the metadata stream, but the allocated metadata size will always be proportional to the allocated primary stream size and at worst logarithmically related to the total primary stream size. Further, in the circular logging case, the modifications allow the metadata to be truncated as the primary data stream is truncated.

Generally, the modifications differentiate the unallocated regions of a sparse file that contain no real content from the allocated portions of the sparse file. Once differentiated, the file system can deallocate the non-content portions. In one implementation, the file system creates a new one-way hash function $g(x)$, as follows:

if $x=0$ $g(x)=0$ else $g(x)=h(x)$ where $h(x)$ is the standard one-way hash function specified in the file format above. The hash function $g(x)$ has the property that data of all zeroes hashes to a hash value of all zeroes.

One other modification is made to the leaf nodes of the tree structure 408 that are associated with file blocks in unallocated ranges that contain no ciphertext. Each leaf node associated with such file blocks is modified such that the access value 604 (i.e., the encrypted hash (irrespective of the encryption key) of the nonexistent plaintext) is set to zero and the verification value 606 (i.e., the hash of the nonexistent ciphertext) is set to zero. Following this adjustment to the leaf nodes, the tree structure 408 is constructed using the hash function $g(x)$ so higher-order intermediate nodes in the tree for zero-value leaf nodes will also be zero: $g(0)=0$.

In this manner, the file system need only allocate ranges for metadata blocks that contain non-zero data, which will be those that correspond to allocated primary stream data. Files that have large ranges of unallocated blocks, such as circular-logging files, will have correspondingly large portions of zero-value metadata. The file system can then simply deallocate this metadata without changing its semantics.

The modifications discussed in this section do not compromise file-write security. It may seem to, since write security rests on the non-invertibility of the one-way hash function, and the non-invertibility in the special case of zero-value data has been compromised. However, all that has been forfeited is that an attacker can trivially compute the hash of zero-value data, but an attacker could have easily computed this value anyway simply by performing the hash computation.

Note that the stored hash value for unallocated ciphertext is zero, whereas I the stored hash value for zero-value ciphertext is $h(0)$, and the stored hash value for ciphertext corresponding to zero-value plaintext is $h(E(0))$. Thus, the tree of hashes distinguishes between all-zero primary-stream blocks and unallocated primary-stream blocks. This prevents an attacker from substituting one of these for the other without detection by the directory servers or storage servers. Such a substitution has the ability to affect application behavior, since applications can query the set of allocated ranges in a file.

One potential downside is that the modifications for supporting sparse files do slightly compromise file-read security because it allows an attacker with no access to cryptographic keys to determine ranges in a file that are unallocated. However, this is not believed to result in a significant information leak.

CONCLUSION

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method implemented at least in part by a machine comprising:
segmenting a sparse file into multiple blocks;
differentiating non-data blocks in the sparse file that contain no substantive content from data blocks in the sparse file that contain substantive data; creating an indexing structure to index individual blocks; and deallocating storage of both the non-data blocks and portions of the indexing structure that reference the non-data blocks that contain no substantive content, wherein the sparse file and the indexinci structure are reduced in size.

2. A method as recited in claim 1, further comprising storing the data blocks in a data stream and the indexing structure in a metadata stream.

3. A method as recited in claim 1, further comprising:
computing a hash of each of the data blocks to produce block hash values; and
encrypting the data blocks using their corresponding block hash values as encryption keys to produce encrypted data blocks.

4. A method as recited in claim 3, wherein the indexing structure contains first leaf nodes for each corresponding data blocks and second leaf nodes for each corresponding non-data block, the first leaf nodes containing an access value for use in decrypting the encrypted data blocks and a verification value for use in verifying individual encrypted data block independently of other encrypted data blocks.

5. One or more computer readable storage media comprising computer-executable instructions that, when executed, perform the method as recited in claim 1.

6. A method comprising:
segmenting a sparse file into multiple blocks, the sparse file containing at least one non-data block that contains no substantive data;
differentiating the non-data blocks from data blocks of the sparse file that contain substantive data;
computing hashes of each of the data blocks to produce block hash values;
encrypting the data blocks using their corresponding block hash values as encryption keys to produce encrypted data blocks;
creating an indexing structure to index individual blocks, the indexing structure containing first leaf nodes for each corresponding encrypted data block and second leaf nodes for each corresponding non-data block, the first leaf nodes containing an access value formed by encrypting the block hash value for the corresponding encrypted block using an access key and a verification value formed by hashing the corresponding encrypted block; and
setting the second leaf nodes to a first binary value.

7. A method as recited in claim 6, further comprising storing the encrypted blocks in a data stream and the indexing structure in a metadata stream.

8. A method as recited in claim 7, further comprising deallocating portions of the metadata stream that hold the second leaf nodes.

9. One or more computer readable storage media comprising computer-executable instructions that, when executed, perform the method as recited in claim 6.

10. One or more computer readable storage media comprising computer-executable instructions that, when executed, direct a computing device to:
segment a sparse file into multiple blocks, the sparse file containing at least one non-data block that contains no substantive data;
differentiate the non-data blocks from data blocks of the sparse file that contain substantive data;
compute hashes of each of the data blocks to produce block hash values;
encrypt the data blocks using their corresponding block hash values as encryption keys to produce encrypted data blocks;
creating an indexing structure to index the non-data blocks and the encrypted data blocks; and
deallocate portions of the indexing structure that reference the non-data blocks.

11. A component in a device in a distributed file system in which files are stored across multiple distributed computers, the component comprising:

a segmenting module to divide a sparse file into multiple blocks, the sparse file containing at least one non-data block that contains no substantive data;
a control module to differentiate the non-data blocks from data blocks of the sparse file that contain substantive data;
a hash module to hash each of the data blocks to produce block hash values;
a cryptographic engine to encrypt the data blocks using their corresponding block hash values as encryption keys to produce encrypted blocks; and
an index builder to create an indexing structure to index individual blocks, the indexing structure containing first leaf nodes for each corresponding encrypted block and second leaf nodes for each corresponding non-data block, the first leaf nodes containing an access value formed by encrypting the block hash value for the corresponding encrypted block using an access key and a verification value formed by hashing the corresponding encrypted block, the second leaf nodes being set to a first binary value.

12. A component as recited in claim 11, wherein the encrypted blocks are stored in a data stream and the indexing structure is stored in a metadata stream.

13. A component as recited in claim 12, wherein the control module deallocates portions of the metadata stream that hold the second leaf nodes.

14. A method implemented at least in part by a machine comprising:
segmenting a sparse file into multiple blocks;
differentiating non-data blocks in the sparse file that contain no substantive content from data blocks in the sparse file that contain substantive data;
creating an indexing structure to index individual blocks;
deallocating storage of both the non-data blocks and portions of the indexing structure that reference the non-data blocks that contain no substantive data, wherein the sparse file is reduced in size;
computing a hash of each of the data blocks to produce block hash values; and
encrypting the data blocks using their corresponding block hash values as encryption keys to produce encrypted data blocks.

15. A method as recited in claim 14, further comprising storing the data blocks in a data stream and the indexing structure in a metadata stream.

16. A method as recited in claim 14, wherein the indexing structure contains first leaf nodes for each corresponding data blocks and second leaf nodes for each corresponding non-data block, the first leaf nodes containing an access value for use in decrypting the encrypted data blocks and a verification value for use in verifying individual encrypted data block independently of other encrypted data blocks.

17. One or more computer readable storage media comprising computer-executable instructions that, when executed, perform the method as recited in claim 14.

* * * * *